United States Patent
Doshi et al.

(10) Patent No.: US 12,386,686 B2
(45) Date of Patent: Aug. 12, 2025

(54) MULTI-TENANT DATA PROTECTION IN EDGE COMPUTING ENVIRONMENTS

(71) Applicant: Intel Corporation, Santa Clara, CA (US)

(72) Inventors: Kshitij Arun Doshi, Tempe, AZ (US); Ned M. Smith, Beaverton, OR (US); Francesc Guim Bernat, Barcelona (ES); Timothy Verrall, Pleasant Hill, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/141,681

(22) Filed: May 1, 2023

(65) Prior Publication Data

US 2023/0267004 A1 Aug. 24, 2023

Related U.S. Application Data

(63) Continuation of application No. 16/723,358, filed on Dec. 20, 2019, now Pat. No. 11,669,368.

(Continued)

(51) Int. Cl.
*G06F 9/54* (2006.01)
*G06F 8/41* (2018.01)
(Continued)

(52) U.S. Cl.
CPC .............. *G06F 9/544* (2013.01); *G06F 8/443* (2013.01); *G06F 9/44594* (2013.01);
(Continued)

(58) Field of Classification Search
None
See application file for complete search history.

(56) References Cited

U.S. PATENT DOCUMENTS 8,656,189 B2 2/2014 Orsini et al.
8,719,590 B1 5/2014 Faibish et al.
(Continued)

FOREIGN PATENT DOCUMENTS

CN 102340533 B 3/2017
CN 106911814 A 6/2017
(Continued)

OTHER PUBLICATIONS

"European Application Serial No. 20801584.2, Partial Supplementary European Search Report mailed May 17, 2023", 14 pgs.
(Continued)

*Primary Examiner* — Abu Zar Ghaffari
(74) *Attorney, Agent, or Firm* — Schwegman Lundberg & Woessner, P.A.

(57) ABSTRACT

Various approaches for implementing multi-tenant data protection are described. In an edge computing system deployment, a system includes memory and processing circuitry coupled to the memory. The processing circuitry is configured to obtain a workflow execution plan that includes workload metadata defining a plurality of workloads associated with a plurality of edge service instances executing respectively on one or more edge computing devices. The workload metadata is translated to obtain workload configuration information for the plurality of workloads. The workload configuration information identifies a plurality of memory access configurations and service authorizations identifying at least one edge service instance authorized to access one or more of the memory access configurations. The memory is partitioned into a plurality of shared memory regions using the memory access configurations. A memory access request for accessing one of the shared memory regions is processed based on the service authorizations.

18 Claims, 13 Drawing Sheets

Related U.S. Application Data

(60) Provisional application No. 62/939,303, filed on Nov. 22, 2019, provisional application No. 62/907,597, filed on Sep. 28, 2019.

(51) Int. Cl.

| | | |
|---|---|---|
| *G06F 9/445* | (2018.01) | |
| *G06F 9/50* | (2006.01) | |
| *G06F 11/34* | (2006.01) | |
| *G06F 16/18* | (2019.01) | |
| *G06F 21/60* | (2013.01) | |
| *H04L 9/00* | (2022.01) | |
| *H04L 9/06* | (2006.01) | |
| *H04L 9/08* | (2006.01) | |
| *H04L 9/40* | (2022.01) | |
| *H04L 41/0893* | (2022.01) | |
| *H04L 41/0894* | (2022.01) | |
| *H04L 41/0895* | (2022.01) | |
| *H04L 41/0896* | (2022.01) | |
| *H04L 41/14* | (2022.01) | |
| *H04L 41/142* | (2022.01) | |
| *H04L 41/5009* | (2022.01) | |
| *H04L 41/5025* | (2022.01) | |
| *H04L 41/5051* | (2022.01) | |
| *H04L 43/08* | (2022.01) | |
| *H04L 47/70* | (2022.01) | |
| *H04L 67/1008* | (2022.01) | |
| *H04L 67/12* | (2022.01) | |
| *H04L 67/141* | (2022.01) | |
| *G06F 9/38* | (2018.01) | |
| *G06F 9/455* | (2018.01) | |
| *G06F 9/48* | (2006.01) | |
| *G06F 11/10* | (2006.01) | |
| *G06F 12/14* | (2006.01) | |
| *G06F 16/23* | (2019.01) | |
| *G16Y 40/10* | (2020.01) | |
| *H04L 9/32* | (2006.01) | |
| *H04L 67/10* | (2022.01) | |

(52) U.S. Cl.
CPC ............ *G06F 9/5016* (2013.01); *G06F 9/505* (2013.01); *G06F 9/5072* (2013.01); *G06F 9/5077* (2013.01); *G06F 11/3433* (2013.01); *G06F 16/1865* (2019.01); *G06F 21/602* (2013.01); *H04L 9/008* (2013.01); *H04L 9/0637* (2013.01); *H04L 9/0822* (2013.01); *H04L 9/0825* (2013.01); *H04L 9/0866* (2013.01); *H04L 41/0893* (2013.01); *H04L 41/0894* (2022.05); *H04L 41/0895* (2022.05); *H04L 41/0896* (2013.01); *H04L 41/142* (2013.01); *H04L 41/145* (2013.01); *H04L 41/5009* (2013.01); *H04L 41/5025* (2013.01); *H04L 41/5051* (2013.01); *H04L 43/08* (2013.01); *H04L 47/822* (2013.01); *H04L 63/0407* (2013.01); *H04L 63/0428* (2013.01); *H04L 63/108* (2013.01); *H04L 63/1408* (2013.01); *H04L 63/20* (2013.01); *H04L 67/1008* (2013.01); *H04L 67/12* (2013.01); *H04L 67/141* (2013.01); *G06F 9/3836* (2013.01); *G06F 9/45533* (2013.01); *G06F 9/4881* (2013.01); *G06F 9/5038* (2013.01); *G06F 11/1004* (2013.01); *G06F 12/1408* (2013.01); *G06F 16/2322* (2019.01); *G06F 2209/509* (2013.01); *G16Y 40/10* (2020.01); *H04L 9/3297* (2013.01); *H04L 67/10* (2013.01)

(56) References Cited

U.S. PATENT DOCUMENTS

| | | | |
|---|---|---|---|
| 10,083,193 B2* | 9/2018 | Meng | H04L 67/1097 |
| 10,142,342 B2 | 11/2018 | Seligson et al. | |
| 10,389,746 B2 | 8/2019 | Sakalanaga et al. | |
| 10,521,360 B1* | 12/2019 | Gibson | G06F 12/1466 |
| 11,087,006 B2 | 8/2021 | Feroz et al. | |
| 11,425,111 B2 | 8/2022 | Smith et al. | |
| 11,669,368 B2 | 6/2023 | Doshi et al. | |
| 11,757,795 B2 | 9/2023 | Grunwald et al. | |
| 12,206,552 B2 | 1/2025 | Guim Bernat et al. | |
| 2003/0065933 A1* | 4/2003 | Hashimoto | G06F 21/126 |
| | | | 713/194 |
| 2007/0067644 A1* | 3/2007 | Flynn | G06F 21/79 |
| | | | 713/189 |
| 2007/0245104 A1* | 10/2007 | Lindemann | G06F 11/1469 |
| | | | 711/162 |
| 2008/0115135 A1 | 5/2008 | Behnen et al. | |
| 2009/0249014 A1* | 10/2009 | Obereiner | G06F 12/1441 |
| | | | 711/163 |
| 2010/0100604 A1* | 4/2010 | Fujiwara | G06F 12/0866 |
| | | | 709/213 |
| 2011/0264920 A1* | 10/2011 | Rieffel | H04L 9/008 |
| | | | 713/189 |
| 2011/0296019 A1 | 12/2011 | Ferris et al. | |
| 2012/0072669 A1* | 3/2012 | Nishiguchi | G06F 12/1027 |
| | | | 711/135 |
| 2012/0303818 A1 | 11/2012 | Thibeault et al. | |
| 2014/0237550 A1 | 8/2014 | Anderson et al. | |
| 2014/0304297 A1* | 10/2014 | Lian | G06F 16/148 |
| | | | 707/769 |
| 2014/0365549 A1 | 12/2014 | Jenkins | |
| 2014/0379928 A1 | 12/2014 | Song et al. | |
| 2015/0067353 A1* | 3/2015 | Hui | H04L 9/088 |
| | | | 713/193 |
| 2015/0271169 A1 | 9/2015 | Seligson et al. | |
| 2015/0310026 A1* | 10/2015 | Chen | H04L 67/52 |
| | | | 707/782 |
| 2016/0203102 A1* | 7/2016 | Meng | H04L 67/1097 |
| | | | 709/212 |
| 2016/0267051 A1 | 9/2016 | Metzler et al. | |
| 2016/0359854 A1* | 12/2016 | Bhargava | G06F 21/45 |
| 2016/0359955 A1 | 12/2016 | Gill et al. | |
| 2017/0010839 A1* | 1/2017 | Masuda | G06F 3/0619 |
| 2017/0249460 A1* | 8/2017 | Lipton | G06F 21/54 |
| 2017/0324813 A1 | 11/2017 | Jain et al. | |
| 2017/0366606 A1 | 12/2017 | Ben-Shaul et al. | |
| 2018/0115522 A1 | 4/2018 | Gleichauf | |
| 2018/0165218 A1* | 6/2018 | Parker | G06F 12/1009 |
| 2018/0189087 A1 | 7/2018 | Palermo et al. | |
| 2018/0285009 A1 | 10/2018 | Guim Bernat et al. | |
| 2019/0004703 A1 | 1/2019 | Johri et al. | |
| 2019/0036678 A1 | 1/2019 | Ahmed | |
| 2019/0042315 A1 | 2/2019 | Smith et al. | |
| 2019/0044703 A1 | 2/2019 | Smith | |
| 2019/0286572 A1* | 9/2019 | Gschwind | G06F 12/1036 |
| 2019/0288934 A1* | 9/2019 | Chakra | H04L 47/41 |
| 2019/0356743 A1 | 11/2019 | Park et al. | |
| 2020/0014633 A1 | 1/2020 | You et al. | |
| 2020/0134207 A1 | 4/2020 | Doshi et al. | |
| 2020/0159415 A1* | 5/2020 | Neelakantam | G06F 3/061 |
| 2021/0125083 A1 | 4/2021 | Ogawa et al. | |
| 2021/0144517 A1 | 5/2021 | Guim Bernat et al. | |
| 2021/0373537 A1 | 12/2021 | Wei et al. | |
| 2022/0141761 A1 | 5/2022 | Cai et al. | |

FOREIGN PATENT DOCUMENTS

| | | |
|---|---|---|
| CN | 114026834 A | 2/2022 |
| DE | 112020000054 T5 | 3/2021 |
| JP | 7612419 B2 | 12/2024 |

(56) References Cited

FOREIGN PATENT DOCUMENTS

| | | |
|---|---|---|
| WO | WO-2020226979 A2 | 11/2020 |
| WO | WO-2020226979 A8 | 11/2020 |

OTHER PUBLICATIONS

Cheol-Ho, Hong, "qCon: QoS-Aware Network Resource Management for Fog Computing", vol. 18, No. 10,, [Online] Retrieved from the internet:https: pdfs.semanticscholar.org 65d2 7b9576f6e39dda2413ad822a46e33a6055b5,pdf, (Oct. 13, 2018), 21 pgs.

Enas, Ahmad, "Location-Aware, Context-Driven QoS for IoT Applications", IEEE Systems Journal, IEEE, US, vol. 14, No. 1, (Feb. 12, 2019), 12 pgs.

Flathagen, Joakim, "A combined Network Access Control and QoS scheme for Software Defined Networks", IEEE Conference on Network Function Virtualization and Software Defined Networks (NFV-SDN), IEEE, (Nov. 27, 2018), 6 pgs.

Gupta, Harshit, "SDFog: A Software Defined Computing Architecture for QoS Aware Service Orchestration over Edge Devices", arxiv.org, Cornell University Library, 201 Olin Library Cornell University Ithaca, NY 14853, (Sep. 5, 2016), 8 pgs.

Joshua, Boley M, "Adaptive QoS for data transfers using software-defined networking", IEEE International Conference on Advanced Networks and Telecommunications Systems (ANTS), IEEE, (Nov. 6, 2016), 6 pgs.

Slavica, Tomovic, "An Architecture for QoS-aware Service Deployment in Software-Defined IoT Networks", 20th International Symposium on Wireless Personal Multimedia Communications (WPMC), IEEE, (Dec. 17, 2017), 7 pgs.

"European Application Serial No. 20801584.2, Extended European Search Report mailed Aug. 18, 2023", 12 pgs.

"European Application Serial No. 20181908.3, Summons to Attend Oral Proceedings mailed Sep. 1, 2023", 9 pgs.

"U.S. Appl. No. 17/119,785, Non Final Office Action mailed Sep. 29, 2023", 12 pgs.

"Indian Application Serial No. 202047055252, Response filed Jul. 17, 2023 to First Examination Report mailed Jan. 16, 2023", w English Claims, 26 pgs.

Calcote, Lee, "Container Networking: A Breakdown, Explanation and Analysis—The New Stack", [Online] Retrieved from the internet:https: thenewstack.io container-networking-breakdown-explanationanalysis , (Sep. 14, 2016), 9 pgs.

Eguro, Ken, "FPGAs for trusted cloud computing", Field Programmable Logic and Applications (FPL), 22nd International Conference on, IEEE, (Aug. 29, 2012), 63-70.

Sven, Akkermans, "Software Technologies for Multi-Tenant Internet of Things Platforms", Ku Leuven, (Apr. 2019), 222 pgs.

Yu, Hong, "A Group Key Distribution Scheme for Wireless Sensor Networks in the Internet of Things Scenario", International Journal of Distributed Sensor Networks, (2012), 12 pgs.

"U.S. Appl. No. 17/119,785, Response filed Dec. 7, 2023 to Non Final Office Action mailed Sep. 29, 2023", 11 pgs.

"U.S. Appl. No. 17/119,785, Final Office Action mailed Feb. 15, 2024", 17 pgs.

"European Application Serial No. 20801584.2, Response filed Feb. 28, 2024 to Extended European Search Report mailed Aug. 18, 2023", 16 pgs.

"U.S. Appl. No. 16/723,358, Examiner Interview Summary mailed Dec. 7, 2022", 3 pgs.

"U.S. Appl. No. 16/723,358, Final Office Action mailed Sep. 8, 2022", 20 pgs.

"U.S. Appl. No. 16/723,358, Non Final Office Action mailed Apr. 6, 2022", 20 pgs.

"U.S. Appl. No. 16/723,358, Notice of Allowability mailed Apr. 26, 2023", 3 pgs.

"U.S. Appl. No. 16/723,358, Notice of Allowance mailed Jan. 25, 2023", 18 pgs.

"U.S. Appl. No. 16/723,358, Preliminary Amendment filed Dec. 20, 2019", 10 pgs.

"U.S. Appl. No. 16/723,358, Response filed Jul. 6, 2022 to Non Final Office Action mailed Apr. 6, 2022", 16 pgs.

"U.S. Appl. No. 16/723,358, Response filed Dec. 2, 2022 to Final Office Action mailed Sep. 8, 2022", 15 pgs.

"U.S. Appl. No. 17/119,785, Preliminary Amendment filed", 7 pgs.

"European Application Serial No. 20181908.3, Communication Pursuant to Article 94(3) EPC mailed Jun. 30, 2022", 10 pgs.

"European Application Serial No. 20181908.3, Extended European Search Report mailed Jan. 19, 2021", 10 pgs.

"European Application Serial No. 20181908.3, Response filed Jun. 21, 2021 to Extended European Search Report mailed Jan. 19, 2021", 25 pgs.

"European Application Serial No. 20181908.3, Response filed Nov. 10, 2022 to Communication Pursuant to Article 94(3) EPC mailed Jun. 30, 2022", 30 pgs.

"Indian Application Serial No. 202047055252, First Examination Report mailed Jan. 16, 2023", w/English Translation, 6 pgs.

"International Application Serial No. PCT/US2020/030554, International Preliminary Report on Patentability mailed Nov. 11, 2021", 8 pgs.

"International Application Serial No. PCT/US2020/030554, International Search Report mailed Jan. 15, 2021", 5 pgs.

"International Application Serial No. PCT/US2020/030554, Written Opinion mailed Jan. 15, 2021", 6 pgs.

Ashkan, Yousefpour, et al., "All One Needs to Know about Fog Computing and Related Edge Computing Paradigms: A Complete Survey", arxiv.org, Cornell University Library, 201 Olin Library Cornell University Ithaca, NY 14853, (Aug. 15, 2018), XP081257480, (Aug. 15, 2018), 1-31.

Guangshun, Li, et al., "Method of Resource Estimation Based on QoS in Edge Computing, Published in: Hindawi Wireless Communications and Mobile Computing", (Jan. 22, 2018), 10 pgs.

Hesham, El-Sayed, et al., "Edge of Things: The Big Picture on the Integration of Edge, IoT and the Cloud in a Distributed Computing Environment", (Feb. 14, 2018), 12 pgs.

Sangster, Paul, et al., "Virtualized Trusted Platform Architecture Specification", Specification Version 1.0 Revision 0.26. TCG Published, (Sep. 27, 2011), 60 pgs.

* cited by examiner

MULTI-TENANT DATA PROTECTION IN EDGE COMPUTING ENVIRONMENTS

PRIORITY CLAIM

This application is a continuation of U.S. patent application Ser. No. 16/723,358, filed Dec. 20, 2019, which claims the benefit of priority to the following provisional applications:

U.S. Provisional Patent Application Ser. No. 62/907,597, filed Sep. 28, 2019, and entitled "MULTI-ENTITY RESOURCE, SECURITY, AND SERVICE MANAGEMENT IN EDGE COMPUTING DEPLOYMENTS;" and United States Provisional Patent Application Ser. No. 62/939,303, filed Nov. 22, 2019, and entitled "MULTI-ENTITY RESOURCE, SECURITY, AND SERVICE MANAGEMENT IN EDGE COMPUTING DEPLOYMENTS."

Each of the above-listed applications is incorporated herein by reference in its entirety.

TECHNICAL FIELD

Embodiments described herein generally relate to data processing, network communication, and communication system implementations, and in particular, to techniques for multi-tenant data or metadata protection using a shared memory access architecture in edge computing and Internet of Things (IoT) device networks.

BACKGROUND

Edge computing, at a general level, refers to the transition of compute and storage resources closer to endpoint devices (e.g., consumer computing devices, user equipment, etc.) in order to optimize total cost of ownership, reduce application latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at the "edge" of the network.

Edge computing use cases in mobile network settings have been developed for integration with multi-access edge computing (MEC) approaches, also known as "mobile edge computing." MEC approaches are designed to allow application developers and content providers to access computing capabilities and an information technology (IT) service environment in dynamic mobile network settings at the edge of the network. Limited standards have been developed by the European Telecommunications Standards Institute (ETSI) industry specification group (ISG) in an attempt to define common interfaces for the operation of MEC systems, platforms, hosts, services, and applications.

Edge computing, MEC, and related technologies attempt to provide reduced latency, increased responsiveness, and more available computing power than offered in traditional cloud network services and wide area network connections. However, the integration of mobility and dynamically launched services to some mobile use and device processing use cases has led to limitations and concerns with orchestration, functional coordination, and resource management, especially in complex mobility settings where many participants (devices, hosts, tenants, service providers, operators) are involved.

In a similar manner, Internet of Things (IoT) networks and devices are designed to offer a distributed compute arrangement, from a variety of endpoints. IoT devices are physical or virtualized objects that may communicate on a network and may include sensors, actuators, and other input/output components, which may be used to collect data or perform actions in a real-world environment. For example, IoT devices may include low-powered endpoint devices that are embedded or attached to everyday things, such as buildings, vehicles, packages, etc., to provide an additional level of artificial sensory perception of those things. Recently, IoT devices have become more popular and thus applications using these devices have proliferated.

The deployment of various Edge, Fog, MEC, private enterprise networks (e.g., software-defined wide-area networks, or SD-WANs), and IoT networks, devices, and services have introduced a number of advanced use cases and scenarios occurring at and towards the edge of the network. However, these advanced use cases have also introduced a number of corresponding technical challenges relating to security, processing, and network resources, service availability, and efficiency, among many other issues. One such challenge is in relation to the protection of multi-tenant data (including metadata) within communication networks, while efficiently utilizing the available network resources (e.g., compute resources of different edge clusters) within the communication networks. More specifically, conventional approaches to end-to-end data protection (e.g., in connection with processing cloud-hosted workloads) use encryption/decryption only at the originating and destination nodes, with multiple intermediate nodes functioning simply as data routers. Such approaches do not fully utilize the workload processing capacities of the intermediate nodes, result in inefficient use of the edge network resources, increased processing time, reduced throughput, etc.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
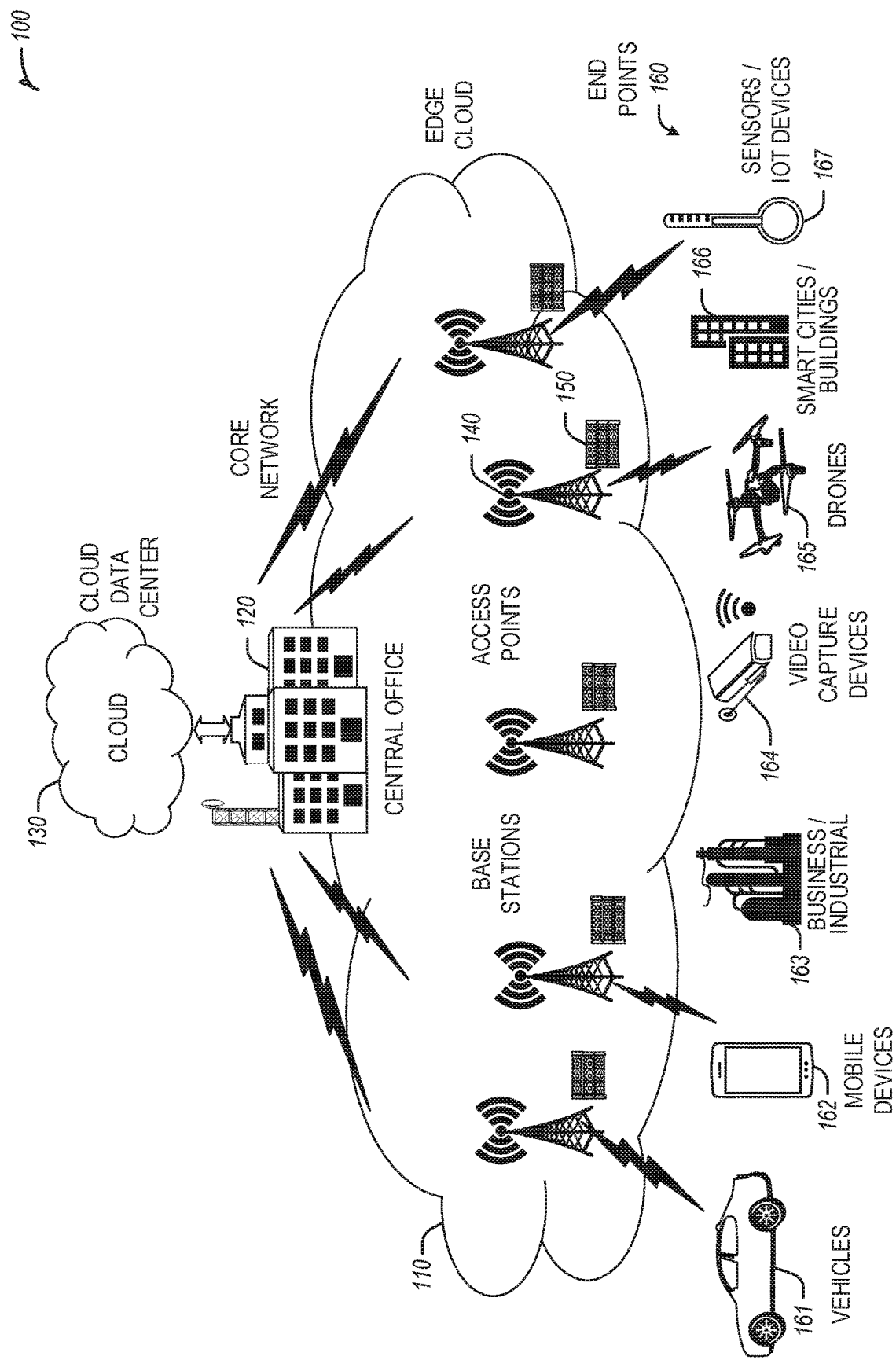
FIG. 1 illustrates an overview of an edge cloud configuration for edge computing, according to an example.

In the following description, methods, configurations, and related apparatuses are disclosed for multi-tenant data protection in edge computing environments. The following examples introduce specific configurations and usage of a platform resource manager with shared memory access (PRM SMA) in a networked device setting. These examples enable platform management flexibility with secure memory sharing among tenants for collaborative execution of data flows and chain of services, as well as an increased number of exposed low-level controls, including bandwidth of various buses (e.g. memory, PCIe, UPI), the utilization of various accelerators, counters, and metrics accessible via a performance monitoring unit or model-specific registers (MSRs), as well as other registers, low-level interfaces, and recipes, to control different aspects of the edge platform resource utilization. In this regard, a PRM SMA may be configured to configure, monitor, and control partitioning and sharing of memory regions with different access privileges as well as control edge platform resources at the granularity of, e.g., individual edge services or containers, of which there can be up to the order of a thousand in a single edge platform. As used herein, the term "platform resources" or "edge platform resources" includes network resources available to an edge computing device within a communication network such as an edge network. In this regard, platform resources may include hardware/software resources of the edge computing device itself as well as resources of other network nodes available for use by the edge computing device. As used herein, the term "tenant" refers to a user of a service provided in network architecture, such as a user of a client node in an edge architecture. As used herein, the term "shared memory" includes collaborative sharing across multiple tenants.

Applicability of Multi-Tenant Data Protection Techniques

The present multi-tenant data protection techniques may be coordinated and monitored in a variety of device and computing system deployment environments involving the edge computing/edge cloud deployments, cloud deployments, Internet of Things (IoT) networks, Multi-Access Edge Computing (MEC) systems, edge workloads such as network function virtualization (NFV) implementations or other virtualized node functions, and other aspects of networking technologies.

Edge networks may provide tenant isolation (e.g., in terms of memory and platform resources such as storage) in different stages of workload processing. However, at the same time, edge devices (e.g., as used by one tenant) may share some level of information with other edge devices (e.g., as used by another tenant) in order to implement some data flows or chain of services for increased processing efficiency. Techniques discussed herein related to multi-tenant data protection using shared memory access may be used in order to increase edge-based workflow processing efficiency.

For example, multi-tenant data protection techniques discussed herein relate to usage of PRMs in edge platforms, allowing developers to provide workload metadata (e.g., via SLOs from an orchestrator node) that describes inter-tenant and intra-tenant protection semantics (e.g., secure keys and transformation functions), as well as express service level objectives/requirements in terms of Key Performance Indicators (KPIs) that are meaningful to the developer/user, such as response time, jitter/determinism, latency, etc. The PRM SMA is further configured to use memory access configuration information within the workload metadata to implement decentralized shared memory models that edge PRMs expose to orchestrators as part of the resource scheduling and allocation steps. In this regard, techniques discussed herein allow various levels of edge clusters between an originating node (e.g., a client device) and a destination node (e.g., a cloud entity) to contribute in workload processing associated with data communicated by the originating node to the destination node, using shared memory access for secure data sharing among individual tenants to preserve the integrity of the data.

As used herein, the term "SLA" refers to SLAs provided within a single platform. A separate layer may be used that spans multiple platforms in order to use end-to-end SLAs in connection with disclosed techniques. To differentiate between SLAs and SLOs, SLOs include application metrics (e.g., frames-per-second, or fps), and SLAs are the resources that are needed to be granted to perform or achieve an SLO (e.g., 10 GBs of memory to obtain 40 fps). An SLA may be considered a representation of interactions between a user/client and a network orchestrator entity, while an SLO may be considered the result of interactions between the network orchestrator entity and a PRM. In this regard, the network orchestrator entity may convert/translate SLAs into SLOs, prior to communicating the SLOs to the PRM for processing. In some aspects, the SLAs and the SLOs may be communicated to the PRM for processing.

For example, in an edge computing environment, multi-tenancy requirements typically translate to resource isolation strategies that call for increasingly finer-grained resource partitioning capabilities with dynamic resource allocation/deallocation functionality. The finer-granularity partitioning schemes that are applied, the greater the overhead is on resource allocation dynamicity. If the resource allocation overhead exceeds the performance KPI window, then resource allocation becomes the gating factor for edge hosting. One of the present examples includes a PRM SMA configuring multiple shared memory regions for secure sharing of data, as well as platform resource monitoring and resource allocation at a sufficiently fine granularity level using low-level controls, allowing for the execution of edge-hosted workloads and flexible monitoring and reassignment of edge platform resources.

Key management for securing data and metadata adds overhead to resource allocation functions further affecting the viability cross-over point for edge-hosted workloads versus traditional cloud-hosted solutions. One of the present examples further includes a PRM SMA using workload metadata to provide service authorization functionalities including key management and distribution as well as the configuration of secure access to different types of shared memory regions.

A brief comparison with conventional approaches, existing cloud-based workflow management techniques do not use edge cloud processing in connection with secure data (e.g., ciphertext data) communicated by a client node. Conventional resource managers expose only basic platform telemetry, such as CPU utilization or network utilization. Additionally, these conventional approaches lack the ability to utilize service level objectives (SLOs) (corresponding to SLAs) that specify workload metadata for configuring shared memory access and include KPIs with lower granularity, such as at the level of a container or an edge service. However, multi-tenant data protection techniques discussed herein configure a PRM SMA to use workload metadata to obtain memory access configurations and service authorizations allowing for multi-tenant data protection and execution of edge-based workloads.

The present platform resource management techniques and configurations may be utilized in connection with many aspects of current networking systems, but are provided with reference to Edge Cloud, IoT, Multi-access Edge Computing (MEC), and other distributed computing deployments. The following systems and techniques may be implemented in, or augment, a variety of distributed, virtualized, or managed edge computing systems. These include environments in which network services are implemented or managed using multi-access edge computing (MEC) or 4G/5G wireless network configurations; or in wired network configurations involving fiber, copper, and other connections. Further, aspects of processing by the respective computing components may involve computational elements that are in the geographical proximity of user equipment or other endpoint locations, such as a smartphone, vehicular communication component, IoT device, etc. Further, the presently disclosed techniques may relate to other Edge/MEC/IoT network communication standards and configurations, and other intermediate processing entities and architectures.

Example Edge Computing Architectures

FIG. 1 is a block diagram 100 showing an overview of a configuration for edge computing, which includes a layer of processing referenced in many of the current examples as an "edge cloud". This network topology, which may include a number of conventional networking layers (including those not shown herein), may be extended through the use of the multi-tenant data protection techniques discussed herein, including the configuration of shared memory access for secure access of data in connection with edge-hosted workloads.

As shown, the edge cloud 110 is co-located at an edge location, such as the base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally, decrease depending on the edge location (e.g., fewer processing resources being available at consumer end point devices than at a base station or at a central office). However, the closer that the edge location is to the endpoint (e.g., UEs), the more that space and power are constrained. Thus, edge computing, as a general design principle, attempts to minimize the number of resources needed for network services, through the distribution of more resources which are located closer both geographically and in-network access time.

The following describes aspects of an edge cloud architecture that covers multiple potential deployments and addresses restrictions that some network operators or service providers may have in their own infrastructures. These include variation of configurations based on the edge location (because edges at a base station level, for instance, may have more constrained performance); configurations based on the type of compute, memory, storage, fabric, acceleration, or like resources available to edge locations, tiers of locations, or groups of locations; the service, security, and management and orchestration capabilities; and related objectives to achieve usability and performance of end services.

Edge computing is a developing paradigm where computing is performed at or closer to the "edge" of a network, typically through the use of a compute platform implemented at base stations, gateways, network routers, or other devices which are much closer to end point devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for the connected user equipment, without further communicating data via backhaul networks. Or as another example, central office network management hardware may be replaced with compute hardware that performs virtualized network functions and offers compute resources for the execution of services and consumer functions for connected devices. These and other scenarios may involve the use of platform resource management, as provided in the discussion below.

In contrast to the network architecture of FIG. 1, traditional endpoint (e.g., UE, vehicle-to-vehicle (V2V), vehicle-to-everything (V2X), etc.) applications are reliant on local device or remote cloud data storage and processing to exchange and coordinate information. A cloud data arrangement allows for long-term data collection and storage but is not optimal for highly time-varying data, such as a collision, traffic light change, etc. and may fail in attempting to meet latency challenges.

Depending on the real-time requirements in a communications context, a hierarchical structure of data processing and storage nodes may be defined in an edge computing deployment. For example, such a deployment may include local ultra-low-latency processing, regional storage, and processing as well as remote cloud data-center based storage and processing. Key performance indicators (KPIs) may be used to identify where sensor data is best transferred and where it is processed or stored. This typically depends on the ISO layer dependency of the data. For example, a lower layer (PHY, MAC, routing, etc.) data typically changes quickly and is better handled locally in order to meet latency requirements. Higher layer data such as Application-Layer data is typically less time-critical and may be stored and processed in a remote cloud data-center.

Figure 2:
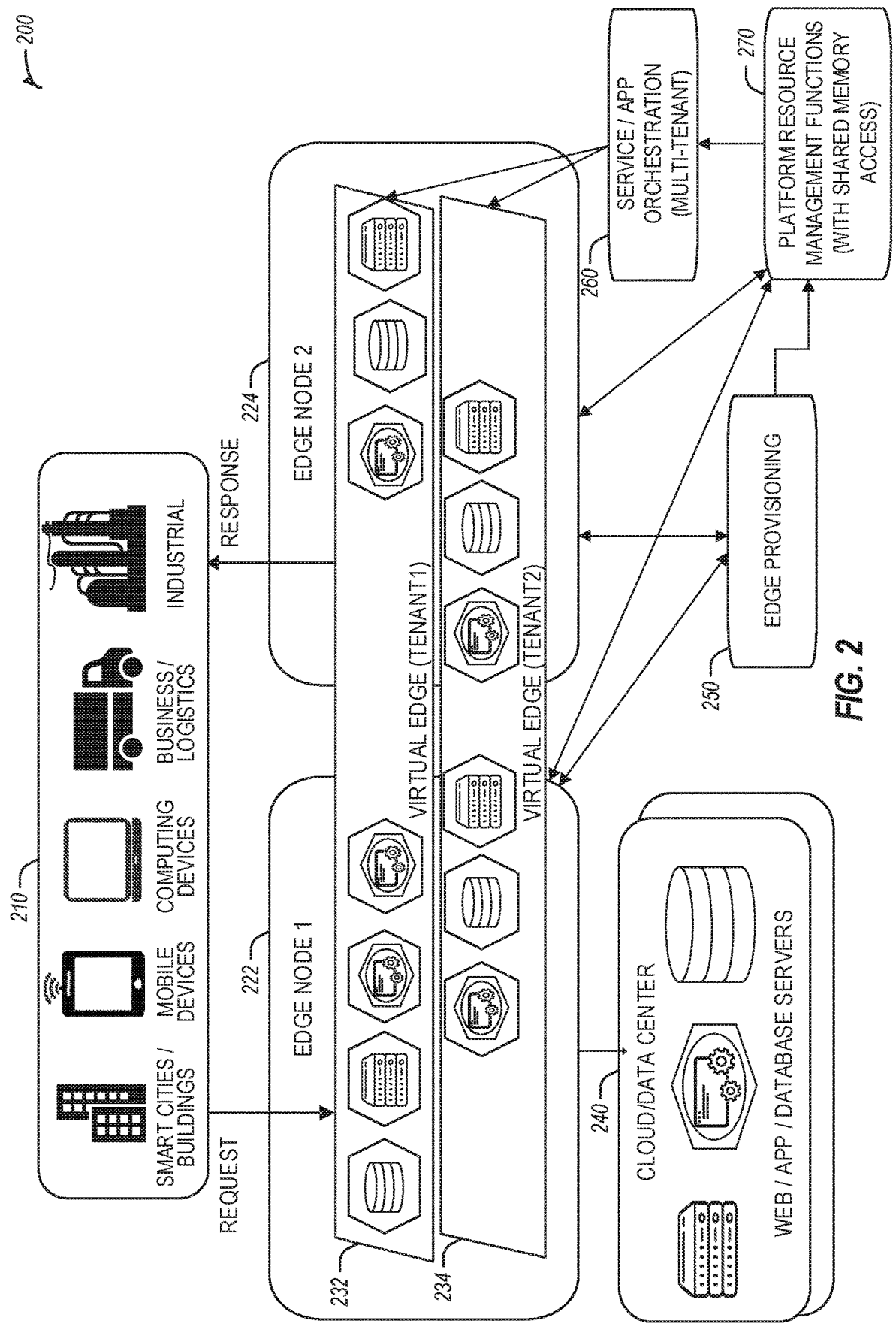
FIG. 2 illustrates deployment and orchestration for virtual edge configurations across an edge-computing system operated among multiple edge nodes and multiple tenants, according to an example.

FIG. 2 illustrates deployment and orchestration for virtual edge configurations across an edge-computing system operated among multiple edge nodes and multiple tenants. Specifically, FIG. 2 depicts coordination of a first edge node 222 and a second edge node 224 in an edge-computing system 200, to fulfill requests and responses for various client endpoints 210 from various virtual edge instances. The virtual edge instances provide edge compute capabilities and processing in an edge cloud, with access to a cloud/data center 240 for higher-latency requests for websites, applications, database servers, etc. Thus, the edge cloud enables coordination of processing among multiple edge nodes for multiple tenants or entities.

In the example of FIG. 2, these virtual edge instances include a first virtual edge 232, offered to a first tenant (Tenant 1), which offers a first combination of edge storage, computing, and services; and a second virtual edge 234, offering a second combination of edge storage, computing, and services, to a second tenant (Tenant 2). The virtual edge instances 232, 234 are distributed among the edge nodes 222, 224, and may include scenarios in which a request and response are fulfilled from the same or different edge nodes. The configuration of each edge node 222, 224 to operate in a distributed yet coordinated fashion with shared memory access occurs based on edge provisioning functions 250 and platform resource management functions 270. The functionality of the edge nodes 222, 224 to provide coordinated operation for applications and services, among multiple tenants, occurs based on orchestration functions 260.

Platform resource management functions 270 can be used to configure at least one platform resource manager with shared memory access (PRM SMA) (e.g., as discussed in connection with FIG. 8-FIG. 12) to manage resource utilization of edge nodes 222 and 224 in connection with one or more SLAs as well as to configure shared memory access for secure access of data while processing edge-hosted workloads. In this regard, one or more of the platform resource management functions 270 may be performed by a PRM SMA (e.g., PRM SMA 902 in FIG. 9).

It should be understood that some of the devices in 210 are multi-tenant devices where Tenant1 may function within a Tenant1 'slice' while a Tenant2 may function within a Tenant2 slice. A trusted multi-tenant device may further contain a tenant-specific cryptographic key such that the combination of key and slice may be considered a "root of trust" (RoT) or tenant-specific RoT. An RoT may further be computed dynamically composed using a security architecture, such as a DICE (Device Identity Composition Engine) architecture where a DICE hardware building block is used to construct layered trusted computing base contexts for layering of device capabilities (such as a Field Programmable Gate Array (FPGA)). The RoT also may be used for a trusted computing context to support respective tenant operations, etc. The use of this RoT and the security architecture may be enhanced by the attestation operations further discussed herein.

The platform resource management functions 270 may partition resources (memory, CPU, GPU, interrupt controller, I/O controller, memory controller, bus controller, etc.), where each partition may contain an RoT capability and where fan-out and layering according to a DICE model may further be applied to edge nodes. Cloud computing nodes consisting of containers, FaaS (function as a service) engines, servlets, servers, or other computation abstraction may be partitioned according to a DICE layering and fan-out structure to support an RoT context for each. Accordingly, the respective RoTs spanning entities 210, 222, and 240 may coordinate the establishment of a distributed trusted computing base (DTCB) such that a tenant-specific virtual trusted secure channel linking all elements end-to-end can be established.

Additionally, the edge computing system may be extended to provide orchestration of multiple applications through the use of containers (a contained, deployable unit of software that provides code and needed dependencies), in a multi-owner, multi-tenant environment. A multi-tenant orchestrator may be used to perform key management, trust anchor management, and other security functions related to the provisioning and lifecycle of the trusted 'slice' concept in FIG. 2. An orchestrator may use a DICE layering and fan-out construction to create a root of trust context that is tenant-specific. Thus, orchestration functions, provided by an orchestrator, may participate as a tenant-specific orchestration provider.

Accordingly, an edge-computing system may be configured to fulfill requests and responses for various client endpoints from multiple virtual edge instances (and, from a cloud or remote data center, not shown). The use of these virtual edge instances supports multiple tenants and multiple applications (e.g., AR/VR, enterprise applications, content delivery, gaming, compute offload) simultaneously. Further, there may be multiple types of applications within the virtual edge instances (e.g., normal applications, latency-sensitive applications, latency-critical applications, user plane applications, networking applications, etc.). The virtual edge instances may also be spanned across systems of multiple owners at different geographic locations.

In further examples, edge computing systems may deploy containers in an edge computing system. As a simplified example, a container manager is adapted to launch containerized pods, functions, and functions-as-a-service instances through execution via compute nodes, or to separately execute containerized virtualized network functions through execution via compute nodes. In this regard, a container can be used for executing an application associated with a service or other virtualized node functions. An edge service instance can include multiple containers, where each container may be associated with its own SLA. A container arrangement (e.g., an edge service instance) may be adapted for use by multiple tenants in system arrangement, where containerized pods, functions, and functions-as-a-service instances are launched within virtual machines specific to each tenant (aside from the execution of virtualized network functions).

Within the edge cloud, a first edge node 222 (e.g., operated by a first owner) and a second edge node 224 (e.g., operated by a second owner) may operate or respond to a container orchestrator as well as to a PRM to coordinate the execution of various applications within the virtual edge instances offered for respective tenants as well as management of platform resources in connection with execution of the various applications. For instance, the edge nodes 222, 224 may be coordinated based on edge provisioning functions 250 and platform resource management functions 270, while the operation of the various applications are coordinated with orchestration functions 260.

Various system arrangements may provide an architecture that treats VMs, Containers, and Functions equally in terms of application composition (and resulting applications are combinations of these three ingredients). Each ingredient may involve the use of one or more accelerators (e.g., FPGA, ASIC) components as a local backend. In this manner, applications can be split across multiple edge owners, coordinated by an orchestrator.

Figure 3:
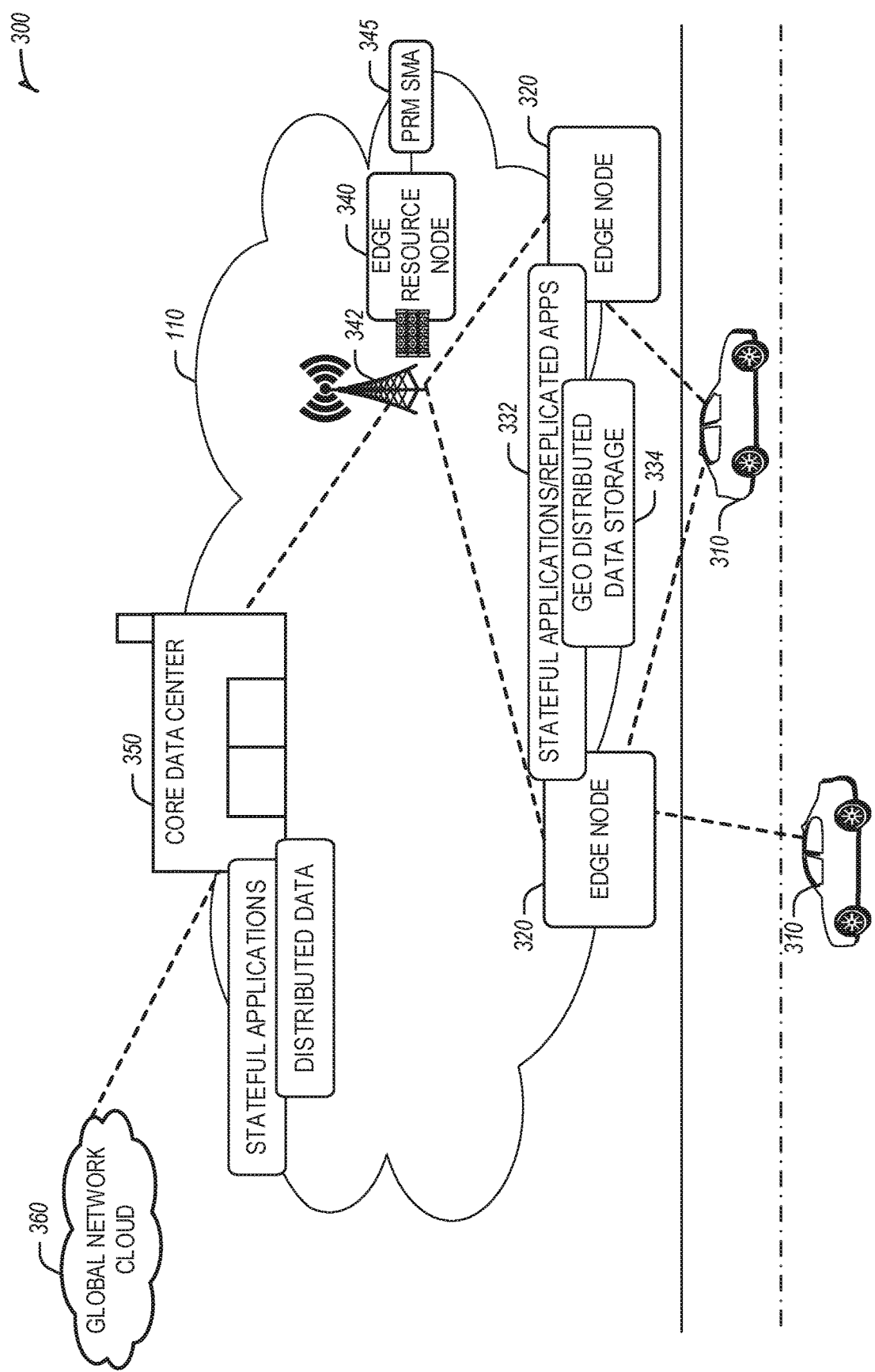
FIG. 3 illustrates a vehicle compute and communication use case involving mobile access to applications in an edge-computing system, according to an example.

It should be appreciated that the edge computing systems and arrangements discussed herein may be applicable in various solutions, services, and/or use cases. As an example, FIG. 3 shows a simplified vehicle compute and communication use case involving mobile access to applications in an edge computing system 300 that implements an edge cloud 110 and a PRM SMA 345 (which can be the same as PRM SMA 902 in FIG. 9). In this use case, each client compute node 310 may be embodied as in-vehicle compute systems (e.g., in-vehicle navigation and/or infotainment systems) located in corresponding vehicles that communicate with the edge gateway nodes 320 during traversal of a roadway. For instance, edge gateway nodes 320 may be located in roadside cabinets, which may be placed along the roadway, at intersections of the roadway, or other locations near the roadway. As each vehicle traverses along the roadway, the connection between its client compute node 310 and a particular edge gateway node 320 may propagate so as to maintain a consistent connection and context for the client compute node 310. Each of the edge gateway nodes 320 includes some processing and storage capabilities and, as such, some processing and/or storage of data for the client compute nodes 310 may be performed on one or more of the edge gateway nodes 320.

Each of the edge gateway nodes 320 may communicate with one or more edge resource nodes 340, which are illustratively embodied as compute servers, appliances or components located at or in a communication base station 342 (e.g., a base station of a cellular network). As discussed above, each edge resource node 340 includes some processing and storage capabilities and, as such, some processing and/or storage of data for the client compute nodes 310 may be performed on the edge resource node 340. For example, the processing of data that is less urgent or important may be performed by the edge resource node 340, while the processing of data that is of a higher urgency or importance may be performed by edge gateway devices or the client nodes themselves (depending on, for example, the capabilities of each component). Further, various wired or wireless communication links (e.g., fiber optic wired backhaul, 5G wireless links) may exist among the edge nodes 320, edge resource node(s) 340, core data center 350, and network cloud 360.

The edge resource nodes 340 (or any other edge nodes within the edge computing system 300) may further include a PRM SMA 345 configured to perform multi-tenant data protection functions discussed herein, including configuring shared memory access and platform resource management in connection with processing one or more workloads associated with client compute nodes 320 as edge-hosted workloads using the edge gateway nodes 320 and/or the edge resource nodes 340. For example, the PRM SMA 345 processes workload metadata of the one or more workloads to obtain workload configuration information identifying memory access configurations for the shared memory access, and service authorizations identifying edge devices (or tenants), applications, or edge service instances that are authorized for the shared memory access and/or to perform certain functions associated with the one or more workloads. The PRM SMA 345 may also set low-level controls for monitoring resources of the edge nodes 320 in connection with one or more SLOs and adjust platform resource usage by the edge nodes 320 based on demands of the client compute nodes 310.

The edge resource node(s) 340 also communicate with the core data center 350, which may include compute servers, appliances, and/or other components located in a central location (e.g., a central office of a cellular communication network). The core data center 350 may provide a gateway to the global network cloud 360 (e.g., the Internet) for the edge cloud 110 operations formed by the edge resource node(s) 340 and the edge gateway nodes 320. Additionally, in some examples, the core data center 350 may include an amount of processing and storage capabilities and, as such, some processing and/or storage of data for the client compute devices may be performed on the core data center 350 (e.g., processing of low priority). The edge gateway nodes 320 or the edge resource nodes 340 may offer the use of stateful applications 332 and a geographically distributed data storage 334 (e.g., database, data store, etc.).

In further examples, FIG. 3 may utilize various types of mobile edge nodes, such as an edge node hosted in a vehicle (e.g., car, truck, tram, train, etc.) or other mobile units, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in a variety of settings, including coordination between some functions or operations at individual endpoint devices or the edge gateway nodes 320, some others at the edge resource node 340, and others in the core data center 350 or the global network cloud 360.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code is executed. The container may be any isolated-execution entity such as a process, an orchestrator, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, the container is "spun down" (e.g., deactivated and/or deallocated) on the infrastructure in response to the execution being completed.

Further aspects of FaaS may enable deployment of edge functions in a service fashion, including support of respective functions that support edge computing as a service. An edge function may be deployed as an edge service instance executing as a plurality of containers on one or more edge computing devices. Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require deployment or configuration).

Example IoT Architectures

Figure 4:
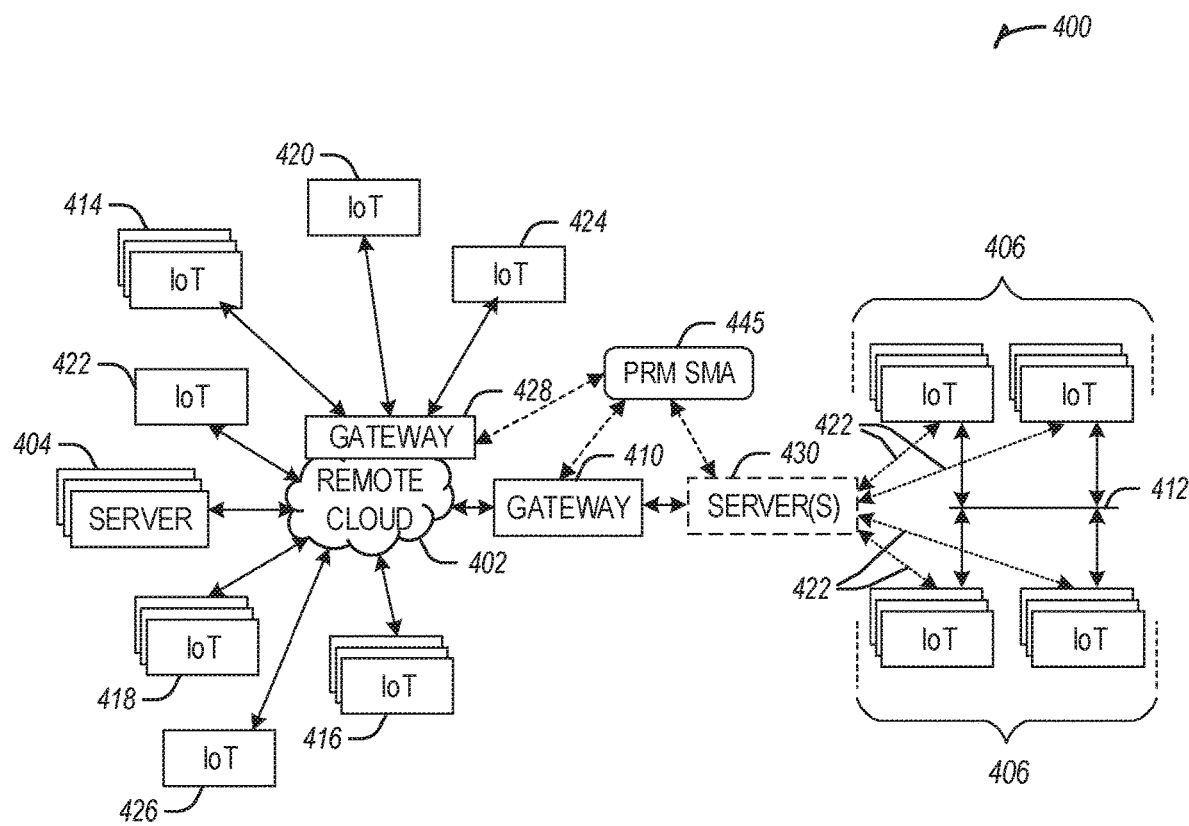
FIG. 4 illustrates a block diagram depicting deployment and communications among a number of Internet of Things (IoT) devices, according to an example.

As a more detailed illustration of an Internet of Things (IoT) network, FIG. 4 illustrates a drawing of a cloud or edge computing network, referred to as "cloud" (or "cloud architecture") 400, in communication with a number of IoT devices and a PRM SMA 445. The IoT is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar (or lower) cost compared to the cost of smaller numbers of larger devices. However, an IoT device may be a smartphone, laptop, tablet, or PC, or other larger device. Further, an IoT device may be a virtual device, such as an application on a smartphone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Returning to FIG. 4, the cloud 400 may represent the Internet or may be a local area network (LAN), or a wide area network (WAN), such as a proprietary network for a company. The IoT devices may include any number of different types of devices, grouped in various combinations. For example, a traffic control group 406 may include IoT devices along streets in a city. These IoT devices may include stoplights, traffic flow monitors, cameras, weather sensors, and the like. The traffic control group 406, or other subgroups, may be in communication with the cloud 400 through wired or wireless links 408, such as LPWA links, optical links, and the like. Further, a wired or wireless sub-network 412 may allow the IoT devices to communicate with each other, such as through a local area network, a wireless local area network, and the like. The IoT devices may use another device, such as a gateway 410 or 428 to communicate with remote locations such as remote cloud 402; the IoT devices may also use one or more servers 430 to facilitate communication with the cloud 400 or with the gateway 410. For example, the one or more servers 430 may operate as an intermediate network node to support a local edge cloud or fog implementation among a local area network. Further, the gateway 428 that is depicted may operate in a cloud-to-gateway-to-many edge devices configuration, such as with the various IoT devices 414, 420, 424 being constrained or dynamic to an assignment and use of resources in the cloud 400.

In an example embodiment, the cloud 400 can further include a PRM SMA 445 which is configured to perform multi-tenant data protection functions and techniques discussed herein (e.g., in connection with FIG. 8-FIG. 12). More specifically, PRM SMA 445 can translate workload metadata (e.g., as available within one or more SLOs) of one or more workloads to obtain workload configuration information identifying memory access configurations for shared memory access, and service authorizations identifying IoT devices, applications, or service instances that are authorized for the shared memory access and/or to perform certain functions associated with the one or more workloads. The PRM SMA 445 also translates KPIs within one or more SLOs into low-level controls associated with platform resources of the gateway 410, gateway 428, servers 404, and servers 430 used within the cloud 400. The PRM 445 can further monitor such low-level controls and adjust platform resource usage to ensure compliance with the KPIs specified within the one or more SLOs.

Other example groups of IoT devices may include remote weather stations 414, local information terminals 416, alarm systems 418, automated teller machines 420, alarm panels 422, or moving vehicles, such as emergency vehicles 424 or other vehicles 426, among many others. Each of these IoT devices may be in communication with other IoT devices, with servers 404, with another IoT device or system, another edge computing or "fog" computing system, or a combination therein. The groups of IoT devices may be deployed in various residential, commercial, and industrial settings (including in both private or public environments).

As may be seen from FIG. 4, a large number of IoT devices may be communicating through the cloud 400. This may allow different IoT devices to request or provide information to other devices autonomously. For example, a group of IoT devices (e.g., the traffic control group 406) may request a current weather forecast from a group of remote weather stations 414, which may provide the forecast without human intervention. Further, an emergency vehicle 424 may be alerted by an automated teller machine 420 that a burglary is in progress. As the emergency vehicle 424 proceeds towards the automated teller machine 420, it may access the traffic control group 406 to request clearance to the location, for example, by lights turning red to block cross traffic at an intersection insufficient time for the emergency vehicle 424 to have unimpeded access to the intersection.

Clusters of IoT devices may be equipped to communicate with other IoT devices as well as with a cloud network. This may allow the IoT devices to form an ad-hoc network between the devices, allowing them to function as a single device, which may be termed a fog device or system. Clusters of IoT devices, such as may be provided by the remote weather stations 414 or the traffic control group 406, may be equipped to communicate with other IoT devices as well as with the cloud 400. This may allow the IoT devices to form an ad-hoc network between the devices, allowing them to function as a single device, which also may be termed a fog device or system.

In further examples, a variety of topologies may be used for IoT networks comprising IoT devices, with the IoT networks coupled through backbone links to respective gateways. For example, a number of IoT devices may communicate with a gateway, and with each other through the gateway. The backbone links may include any number of wired or wireless technologies, including optical networks, and may be part of a local area network (LAN), a wide area network (WAN), or the Internet. Additionally, such communication links facilitate optical signal paths among both IoT devices and gateways, including the use of MUXing/de-MUXing components that facilitate the interconnection of the various devices.

The network topology may include any number of types of IoT networks, such as a mesh network provided with the network using Bluetooth low energy (BLE) links. Other types of IoT networks that may be present include a wireless local area network (WLAN) network used to communicate with IoT devices through IEEE 802.11 (Wi-Fi®) links, a cellular network used to communicate with IoT devices through an LTE/LTE-A (4G) or 5G cellular network, and a low-power wide-area (LPWA) network, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF).

Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with the use of a variety of network and internet application protocols such as the Constrained Application Protocol (CoAP). The respective IoT networks may also be integrated with coordinator devices that provide a chain of links that forms a cluster tree of linked devices and networks.

IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration, and quality of service (QoS) based swarming and fusion of resources.

An IoT network, arranged as a mesh network, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource-based trust and service indices may be inserted to improve the data integrity, quality, assurance and deliver a metric of data confidence.

An IoT network, arranged as a WLAN network, for instance, may use systems that perform standards conversion to provide multi-standard connectivity, enabling IoT devices using different protocols to communicate. Further systems may provide seamless interconnectivity across a multi-standard infrastructure comprising visible Internet resources and hidden Internet resources.

An IoT network, using communications in the cellular network, for instance, may be enhanced by systems that offload data, extend communications to more remote devices, or both. An LPWA network may include systems that perform non-Internet protocol (IP) to IP interconnections, addressing, and routing. Further, each of the IoT devices may include the appropriate transceiver for wide-area communications with that device. Further, each IoT device may include other transceivers for communications using additional protocols and frequencies.

In further examples, an edge or cloud computing network may be in communication with a mesh network of IoT devices at the edge of the cloud computing network. The mesh network of IoT devices may be termed a fog device or system, operating at the edge of the cloud. This fog device or system may be a massively interconnected network where a number of IoT devices are in communications with each other by radio links, for example. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

These and other examples of IoT networks may be enhanced with the following uses of platform resource management using the PRM 445, such as using the PRM-related functions described in connection with FIGS. 8-15. In this manner, an IoT device may be a client, which accesses a resource provided by gateway 410, gateway 428, servers 404, or servers 430, which may be monitored and configured by the PRM 445 within the cloud 400, based on KPIs within one or more SLAs specified for a container or service associated with the cloud 400.

Example MEC Architectures

Some of the techniques and configurations discussed with reference to MEC may be (but are not required to be) relevant to the standards and approaches published in ETSI GS MEC-003 "Mobile Edge Computing (MEC); Framework and Reference Architecture" (e.g., V2.0.3) and related MEC or networked operational implementations. However, while the present resource management techniques and configurations may provide significant benefits to MEC architectures, the applicability of the present techniques and configurations may be extended to any number of edge computing, IoT, fog, or distributed computing platforms.

MEC is intended to support developing mobile use cases of edge computing, to allow application developers and content providers to access computing capabilities and an IT service environment in dynamic settings at the edge of the network. MEC offers application developers and content providers cloud-computing capabilities and an IT service environment using equipment located closer to network (e.g., cellular network) edges. This environment is characterized by ultra-low latency and high bandwidth as well as real-time access to radio network information that may be leveraged by applications. MEC technology permits operators to flexibly and rapidly deploy innovative applications and services towards mobile subscribers, enterprises and vertical segments.

MEC, like other edge computing deployments, may reduce network congestion by operating applications, data functions, and discovery, etc. closer to the user (e.g., mobile device, user equipment (UE), station (STA), etc.). Some MEC details dealing with security (e.g., both user security as well as application integrity), radio use, etc., have been promulgated by European Telecommunications Standards Institute (ETSI), such as described in the "Mobile Edge Computing Introductory Technical White Paper," published Sep. 1, 2014. A set of specifications and white papers providing further details and implementation use cases for MEC scenarios is being developed and published on an ongoing basis by ETSI as part of the ETSI MEC industry specification group (ISG).

MEC architectures offer application developers and content providers cloud-computing capabilities and an IT service environment at the edge of the network. This environment is characterized by ultra-low latency and high bandwidth as well as real-time access to radio network information that can be leveraged by applications. MEC technology thus permits flexible and rapid deployment of innovative applications and services towards mobile subscribers, enterprises and vertical segments. For instance, in automotive settings, applications such as V2X (vehicle-to-everything, IEEE 802.11p based or 3GPP LTE-V2X based) may use MEC technology to exchange data, provide data to aggregation points, and access data in databases to provide and obtain an overview of the local situation derived from a multitude of sensors (by various cars, roadside units, etc.).

Figure 5:
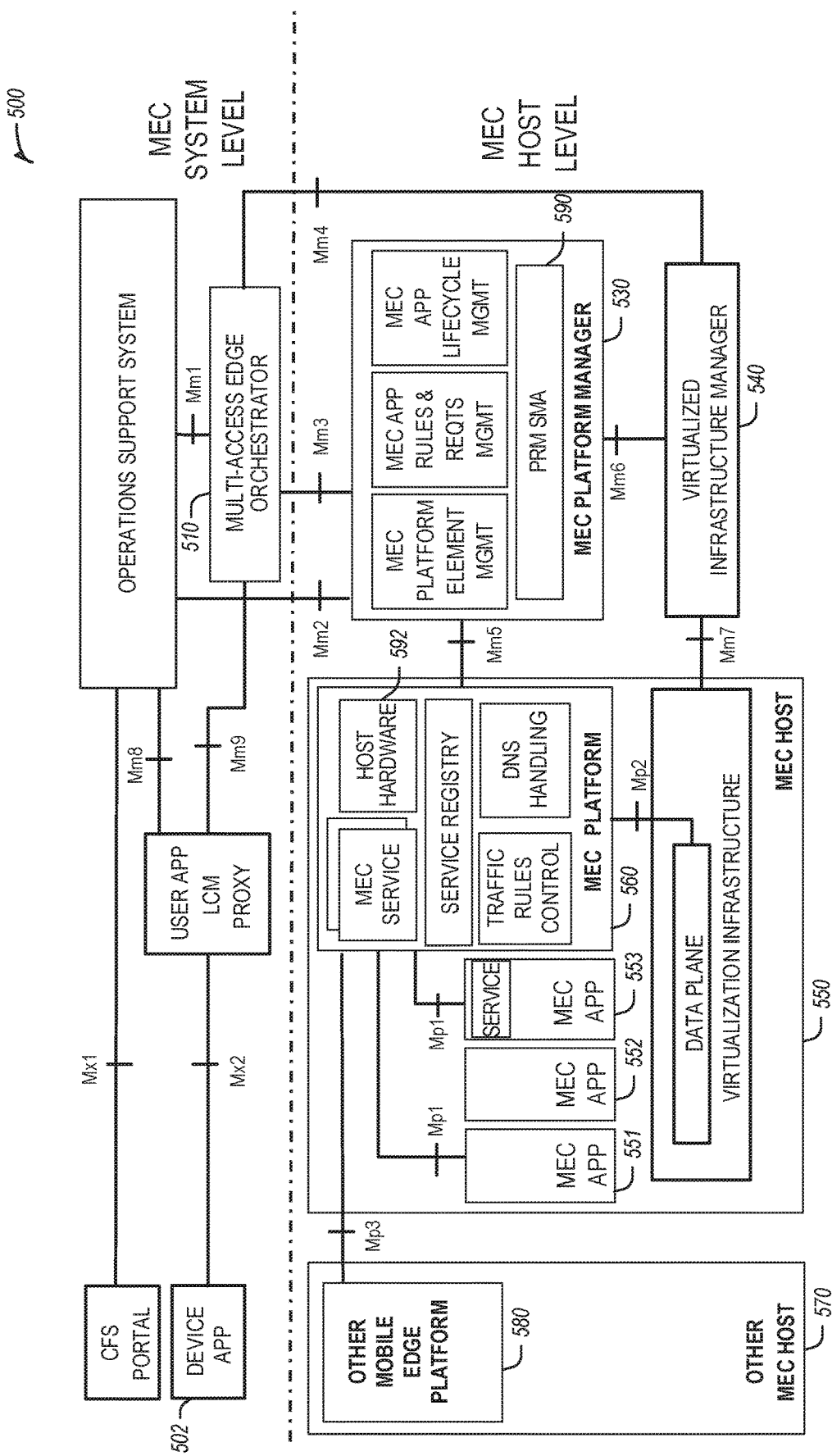
FIG. 5 illustrates a block diagram for a Multi-access Edge Computing (MEC) system architecture using a platform resource manager (PRM), according to an example.

FIG. 5 depicts a block diagram 500 for an example Multi-access Edge Computing (MEC) system architecture. In an example, the MEC system architecture may be defined according to a specification, standard, or other definition (e.g., according to the ETSI ISG MEC-003 specification). In this diagram, Mp reference points refer to MEC platform functionality, Mm reference points refer to management, and Mx refers to connections to external entities. The services, applications, orchestrators, and other entities discussed herein may be implemented at any number of the entities of the MEC system architecture depicted in FIG. 5, and the communications to perform network operations may be implemented at any number of the interfaces of the MEC system architecture depicted in FIG. 5.

Figure 8:
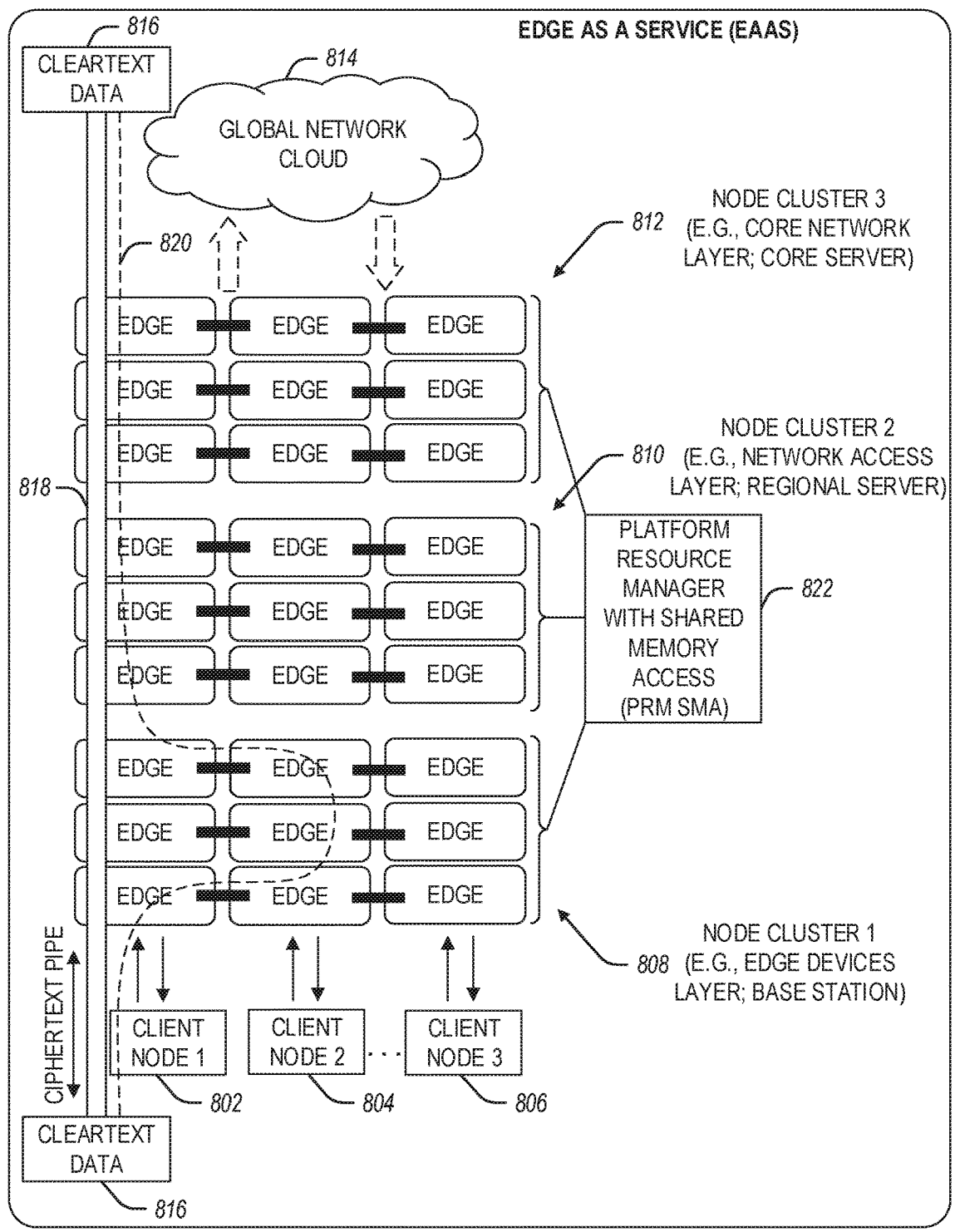
FIG. 8 illustrates a block diagram of an Edge-as-a-Service (EaaS) architecture using a platform resource manager with shared memory access (PRM SMA), according to an example.
Figure 9:
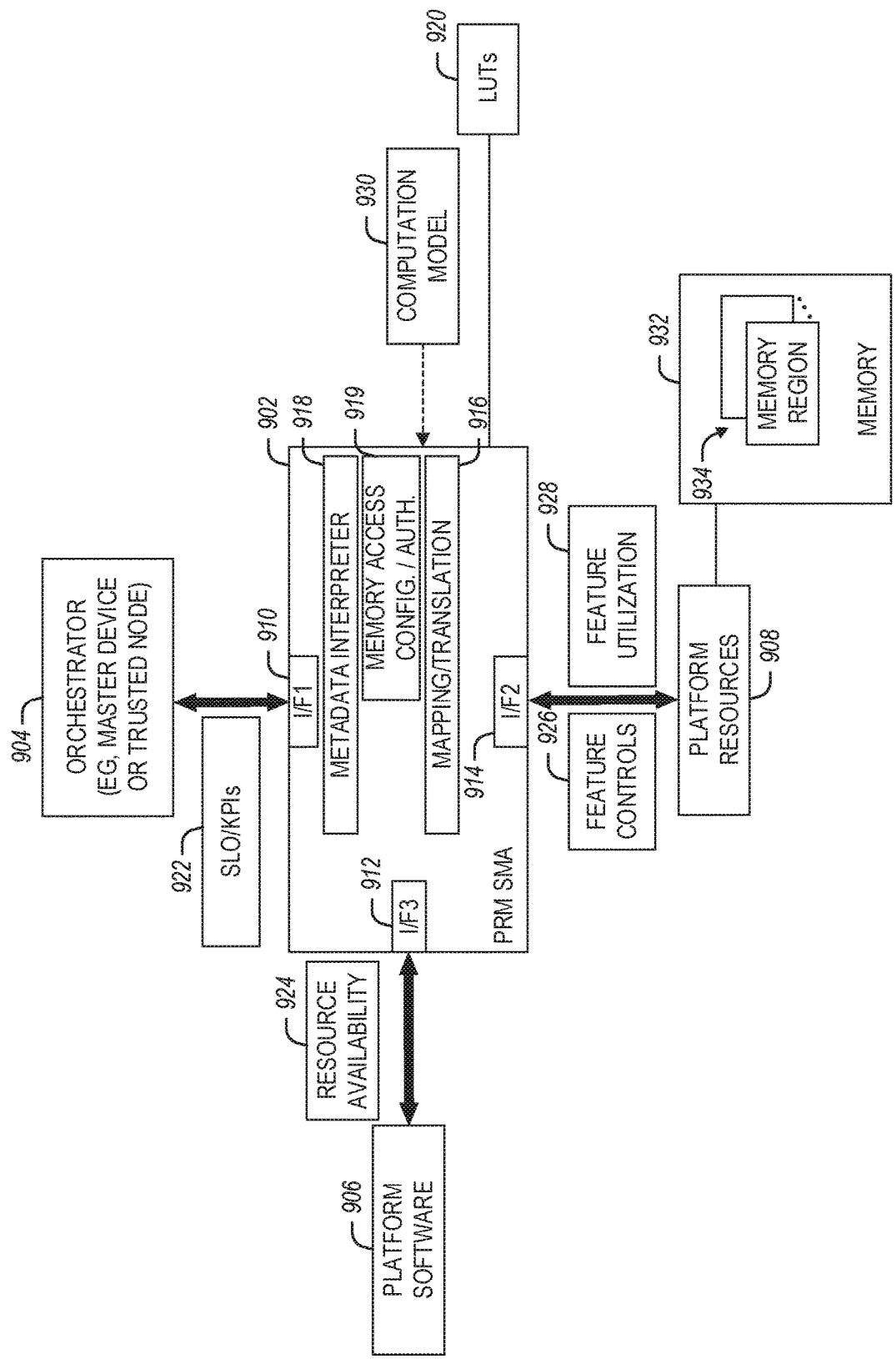
FIG. 9 is a block diagram illustrating a PRM SMA, according to an example.
Figure 10:
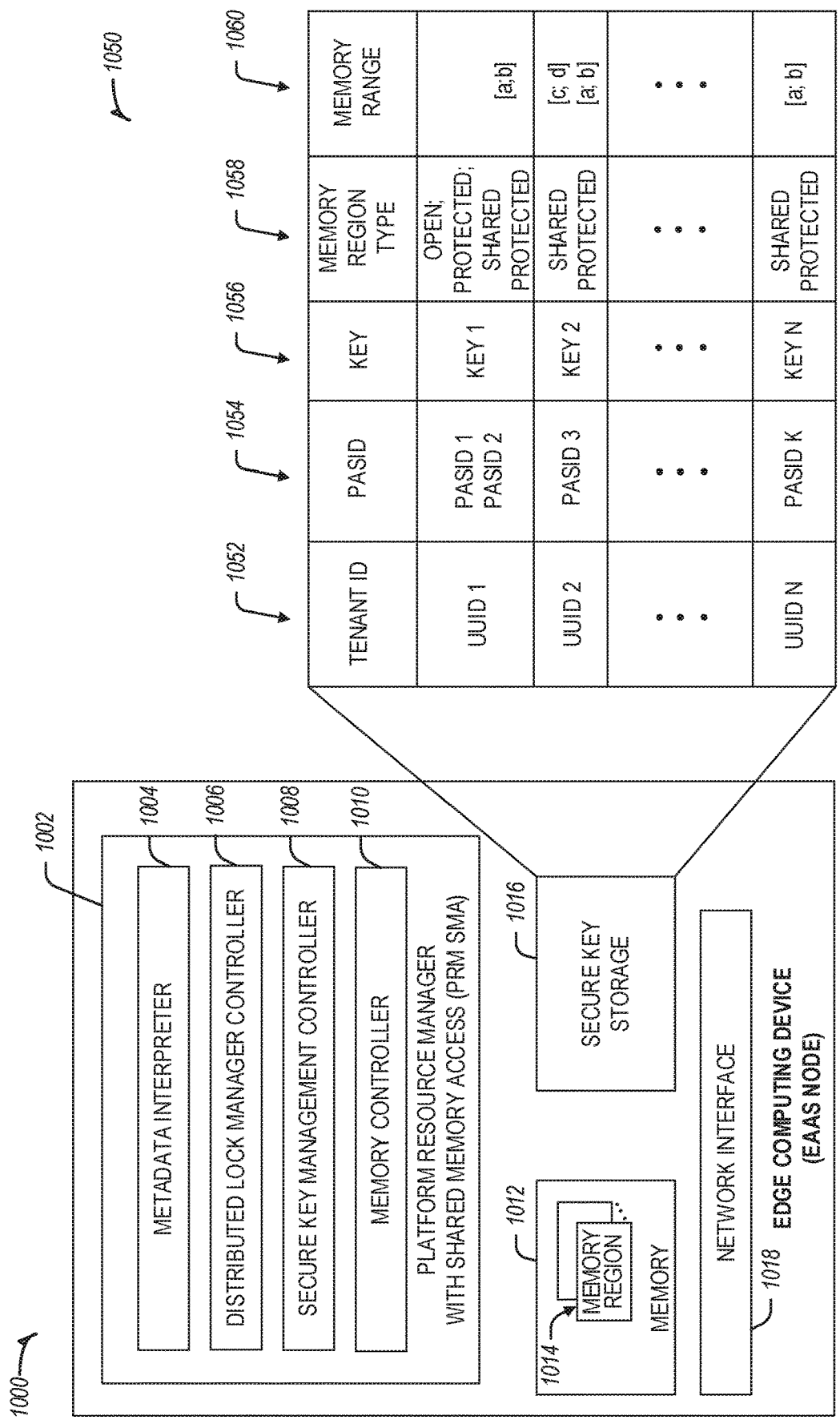
FIG. 10 is a diagram illustrating an edge computing device using a PRM SMA and secure key storage in connection with providing multiple edge tenants different types of secure shared access to memory regions, according to an example.

For instance, a device application 502 operating at a client user equipment device (e.g., smartphone) may access a multi-access edge orchestrator 510, to obtain SLA information from an orchestrator as further detailed in FIGS. 8-10. A MEC Host 550 may operate one or more MEC applications 551, 552, 553 or a platform 560 using host hardware 592 (including one or more shared memory regions), which may be managed by the PRM SMA 590 within the MEC platform manager 530 using the SLA information received from the orchestrator 510. The PRM SMA 590 may perform similar functions (e.g., functions associated with multi-tenant data protection including shared memory access) as PRM SMA 902 of FIG. 9 but in a MEC-based architecture. A virtualized infrastructure manager 540 and the MEC platform manager 530 provide management of the use of the hosts, platforms, and resources, using platform management techniques in connection with the PRM 590. The virtualized infrastructure manager 540 and the MEC platform manager 530 may also use the PRM SMA 590 to provide managed access to shared memory resources by other MEC hosts (e.g., host 570) or MEC platforms (e.g., platform 580).

FIG. 5 illustrates a remote/distributed implementation of the PRM SMA 590 (e.g., the PRM SMA 590 is outside of the MEC host). However, the disclosure is not limited in this regard and the PRM SMA 590 may be implemented within the MEC host 550 or another network entity.

Example Computing Devices

Figure 6:
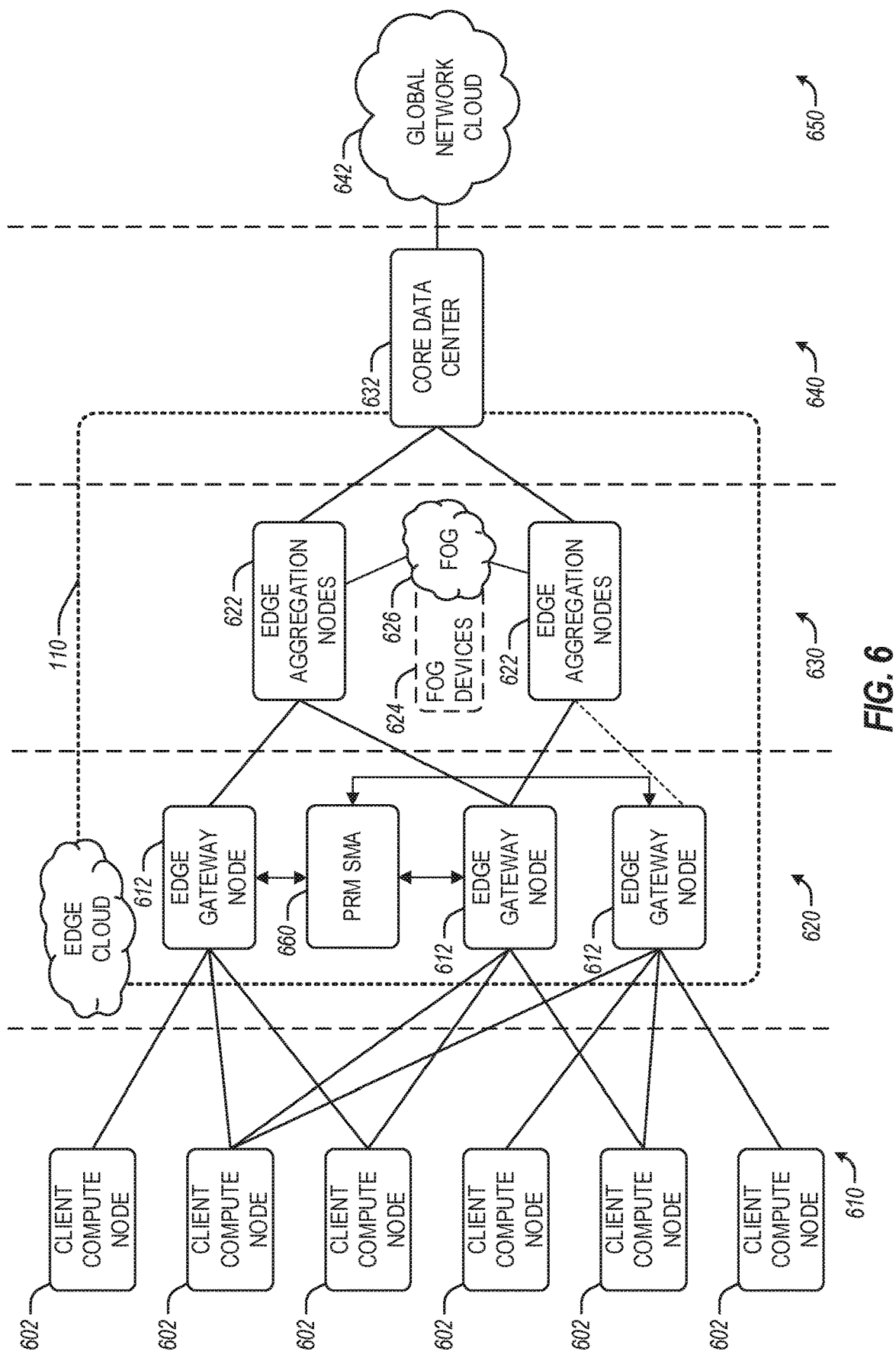
FIG. 6 illustrates an overview of layers of distributed compute deployed among an edge computing system, according to an example.

At a more generic level, an edge computing system may be described to encompass any number of deployments operating in the edge cloud 110, which provide coordination from client and distributed computing devices. FIG. 6 provides a further abstracted overview of layers of distributed compute deployed among an edge computing environment for purposes of illustration.

FIG. 6 generically depicts an edge computing system for providing edge services and applications to multi-stakeholder entities, as distributed among one or more client compute nodes 602, one or more edge gateway nodes 612, one or more edge aggregation nodes 622, one or more core data centers 632, and a global network cloud 642, as distributed across layers of the network. The implementation of the edge computing system may be provided at or on behalf of a telecommunication service provider ("telco", or "TSP"), internet-of-things service provider, a cloud service provider (CSP), enterprise entity, or any other number of entities. Various forms of wired or wireless connections may be configured to establish connectivity among the nodes 602, 612, 622, 632, including interconnections among such nodes (e.g., connections among edge gateway nodes 612, and connections among edge aggregation nodes 622).

Each node or device of the edge computing system is located at a particular layer corresponding to layers 610, 620, 630, 640, and 650. For example, the client compute nodes 602 are each located at an endpoint layer 610, while each of the edge gateway nodes 612 is located at an edge devices layer 620 (local level) of the edge computing system. Additionally, each of the edge aggregation nodes 622 (and/or fog devices 624, if arranged or operated with or among a fog networking configuration 626) is located at a network access layer 630 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with edge computing as discussed herein; many of the edge computing aspects discussed herein are applicable to fog networks, fogging, and fog configurations. Further, aspects of the edge computing systems discussed herein may be configured as a fog, or aspects of a fog may be integrated into an edge computing architecture.

The core data center 632 is located at a core network layer 640 (e.g., a regional or geographically-central level), while the global network cloud 642 is located at a cloud data center layer 650 (e.g., a national or global layer). The use of "core" is provided as a term for a centralized network location—deeper in the network—which is accessible by multiple edge nodes or components; however, a "core" does not necessarily designate the "center" or the deepest location of the network. Accordingly, the core data center 632 may be located within, at, or near the edge cloud 110.

Although an illustrative number of client compute nodes 602, edge gateway nodes 612, edge aggregation nodes 622, core data centers 632, and global network clouds 642 are shown in FIG. 6, it should be appreciated that the edge computing system may include more or fewer devices or systems at each layer. Additionally, as shown in FIG. 6, the number of components of each layer 610, 620, 630, 640, and 650 generally increases at each lower level (i.e., when moving closer to endpoints). As such, one edge gateway node 612 may service multiple client compute nodes 602, and one edge aggregation node 622 may service multiple edge gateway nodes 612.

Consistent with the examples provided herein, each client compute node 602 may be embodied as any type of end point component, device, appliance, or "thing" capable of communicating as a producer or consumer of data. Further, the label "node" or "device" as used in the edge computing system 600 does not necessarily mean that such node or device operates in a client or slave role; rather, any of the nodes or devices in the edge computing system 600 refer to individual entities, nodes, or subsystems which include discrete or connected hardware or software configurations to facilitate or use the edge cloud 110.

As such, the edge cloud 110 is formed from network components and functional features operated by and within the edge gateway nodes 612 and the edge aggregation nodes 622 of layers 620, 630, respectively. The edge cloud 110 may be embodied as any type of network that provides edge computing and/or storage resources which are proximately located to radio access network (RAN) capable endpoint devices (e.g., mobile computing devices, IoT devices, smart devices, etc.), which are shown in FIG. 6 as the client compute nodes 602. In other words, the edge cloud 110 may be envisioned as an "edge" which connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the edge cloud 110 may form a portion of or otherwise provide an ingress point into or across a fog networking configuration 626 (e.g., a network of fog devices 624, not shown in detail), which may be embodied as a system-level horizontal and distributed architecture that distributes resources and services to perform a specific function. For instance, a coordinated and distributed network of fog devices 624 may perform computing, storage, control, or networking aspects in the context of an IoT system arrangement. Other networked, aggregated, and distributed functions may exist in the edge cloud 110 between the cloud data center layer 650 and the client endpoints (e.g., client compute nodes 602). Some of these are discussed in the following sections in the context of network functions or service virtualization, including the use of virtual edges and virtual services which are orchestrated for multiple stakeholders.

The edge gateway nodes 612 and the edge aggregation nodes 622 cooperate to provide various edge services and security to the client compute nodes 602. Furthermore, because each client compute node 602 may be stationary or mobile, each edge gateway node 612 may cooperate with other edge gateway devices to propagate presently provided edge services and security as the corresponding client compute node 602 moves about a region. To do so, each of the edge gateway nodes 612 and/or edge aggregation nodes 622 may support multiple tenancies and multiple stakeholder configurations, in which services from (or hosted for) multiple service providers and multiple consumers may be supported and coordinated across a single or multiple compute devices.

In various examples, the present multi-tenant data protection techniques may be implemented among the client compute nodes 602, the edge gateway nodes 612, the aggregation nodes 622, and other intermediate nodes in the edge cloud 110 (e.g., which operate orchestrator functions or other node management functions, etc.), as further discussed below with reference to FIGS. 8-12. For example, the edge cloud 110 may include a PRM SMA 660 (which can be similar to the PRM SMA 902 in FIG. 9) that is configured to perform multi-tenant data protection functions including configuring shared memory access in connection with edge-hosted workloads as discussed herein (e.g., as performed by or as discussed in connection with FIG. 8-FIG. 12). More specifically, PRM SMA 660 comprises suitable circuitry, logic, interfaces, and/or code and is configured to translate workload metadata within one or more SLOs into memory access configurations for memory regions that may be shared between edge nodes (e.g., the client compute nodes 602, the edge gateway nodes 612, the aggregation nodes 622, and other intermediate nodes in the edge cloud 110), edge service instances or applications. The PRM SMA 660 may further translate the workload metadata to obtain service authorizations identifying one or more functions (e.g., data transformation functions, homomorphic functions, etc.) as well as devices, instances, applications, etc. that are authorized for shared memory access and to perform the identified functions in connection with execution of the edge-hosted workloads.

In further examples, any of the compute nodes or devices discussed with reference to the present edge computing systems and environment may be fulfilled based on the components depicted in FIGS. 7A and 7B. Each edge compute node may be embodied as a type of device, appliance, computer, or other "thing" capable of communicating with other edges, networking, or endpoint components. For example, an edge compute device may be embodied as a smartphone, a mobile compute device, a smart appliance, an in-vehicle compute system (e.g., a navigation system), or other device or system capable of performing the described functions.

Figure 7A:
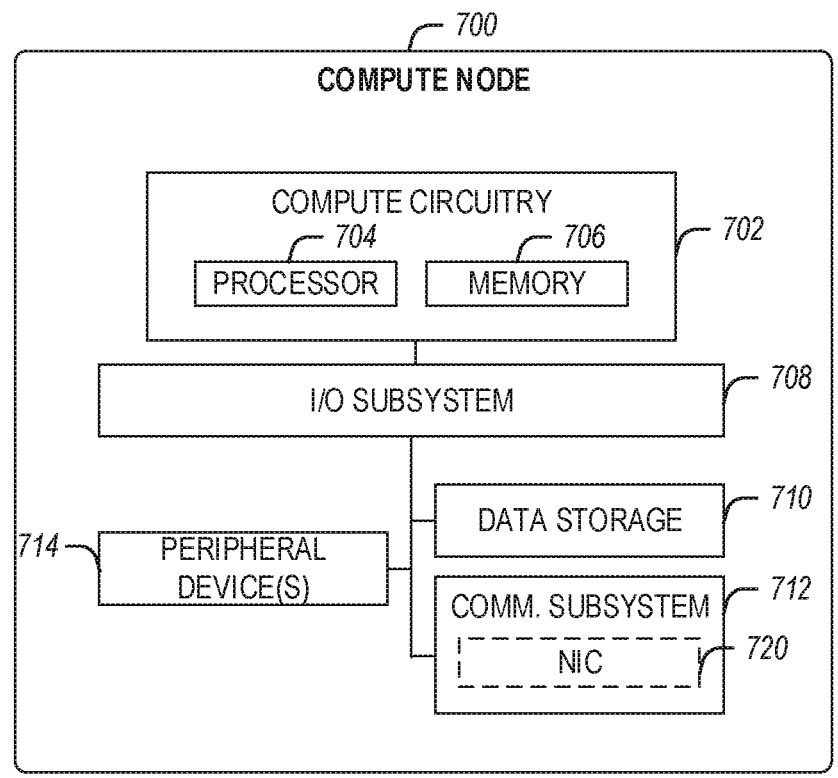
FIG. 7A illustrates an overview of example components deployed at a compute node system, according to an example.

In the simplified example depicted in FIG. 7A, an edge compute node 700 includes a compute engine (also referred to herein as "compute circuitry") 702, an input/output (I/O) subsystem 708, data storage 710, a communication circuitry subsystem 712, and, optionally, one or more peripheral devices 714. In other examples, each compute device may include other or additional components, such as those used in personal or server computing systems (e.g., a display, peripheral devices, etc.). Additionally, in some examples, one or more of the illustrative components may be incorporated in, or otherwise form a portion of, another component.

The compute node 700 may be embodied as any type of engine, device, or collection of devices capable of performing various compute functions. In some examples, the compute node 700 may be embodied as a single device such as an integrated circuit, an embedded system, a field-programmable gate array (FPGA), a system-on-a-chip (SOC), or other integrated system or device. In the illustrative example, the compute node 700 includes or is embodied as a processor 704 and a memory 706. The processor 704 may be embodied as any type of processor capable of performing the functions described herein (e.g., executing an application). For example, the processor 704 may be embodied as a multi-core processor(s), a microcontroller, or other processor or processing/controlling circuit. In some examples, the processor 704 may be embodied as, include, or be coupled to an FPGA, an application-specific integrated circuit (ASIC), reconfigurable hardware or hardware circuitry, or other specialized hardware to facilitate the performance of the functions described herein.

The main memory 706 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three-dimensional crosspoint memory device (e.g., Intel 3D XPoint™ memory), or other byte-addressable write-in-place nonvolatile memory devices. The memory device may refer to the die itself and/or to a packaged memory product. In some examples, 3D crosspoint memory (e.g., Intel 3D XPoint™ memory) may comprise a transistor-less stackable cross-point architecture in which memory cells sit at the intersection of word lines and bit lines and are individually addressable and in which bit storage is based on a change in bulk resistance. In some examples, all or a portion of the main memory 706 may be integrated into the processor 704. The main memory 706 may store various software and data used during operation such as one or more applications, data operated on by the application(s), libraries, and drivers.

The compute circuitry 702 is communicatively coupled to other components of the compute node 700 via the I/O subsystem 708, which may be embodied as circuitry and/or components to facilitate input/output operations with the compute circuitry 702 (e.g., with the processor 704 and/or the main memory 706) and other components of the compute circuitry 702. For example, the I/O subsystem 708 may be embodied as, or otherwise include memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 708 may form a portion of a system-on-a-chip (SoC) and be incorporated, along with one or more of the processor 704, the main memory 706, and other components of the compute circuitry 702, into the compute circuitry 702.

The one or more illustrative data storage devices 710 may be embodied as any type of device configured for short-term or long-term storage of data such as, for example, memory devices and circuits, memory cards, hard disk drives, solid-state drives, or other data storage devices. Each data storage device 710 may include a system partition that stores data and firmware code for the data storage device 710. Each data storage device 710 may also include one or more operating system partitions that store data files and executables for operating systems depending on, for example, the type of compute node 700.

The communication circuitry 712 may be embodied as any communication circuit, device, or collection thereof, capable of enabling communications over a network between the compute circuitry 702 and another compute device (e.g., an edge gateway node 612 of the edge computing system 600). The communication circuitry 712 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, etc.) to effect such communication.

The illustrative communication circuitry 712 includes a network interface controller (NIC) 720, which may also be referred to as a host fabric interface (HFI). The NIC 720 may be embodied as one or more add-in-boards, daughter cards, network interface cards, controller chips, chipsets, or other devices that may be used by the compute node 700 to connect with another compute device (e.g., an edge gateway node 612). In some examples, the NIC 720 may be embodied as part of a system-on-a-chip (SoC) that includes one or more processors or included on a multichip package that also contains one or more processors. In some examples, the NIC 720 may include a local processor (not shown) and/or a local memory and storage (not shown) that are local to the NIC 720. In such examples, the local processor of the NIC 720 (which can include general-purpose accelerators or specific accelerators) may be capable of performing one or more of the functions of the compute circuitry 702 described herein. Additionally, or alternatively, in such examples, the local memory of the NIC 720 may be integrated into one or more components of the client compute node at the board level, socket level, chip level, and/or other levels.

Additionally, in some examples, each compute node 700 may include one or more peripheral devices 714. Such peripheral devices 714 may include any type of peripheral device found in a compute device or server such as audio input devices, a display, other input/output devices, interface devices, and/or other peripheral devices, depending on the particular type of the compute node 700. In further examples, the compute node 700 may be embodied by a respective edge compute node in an edge computing system (e.g., client compute node 602, edge gateway node 612, edge aggregation node 622) or like forms of appliances, computers, subsystems, circuitry, or other components.

Figure 7B:
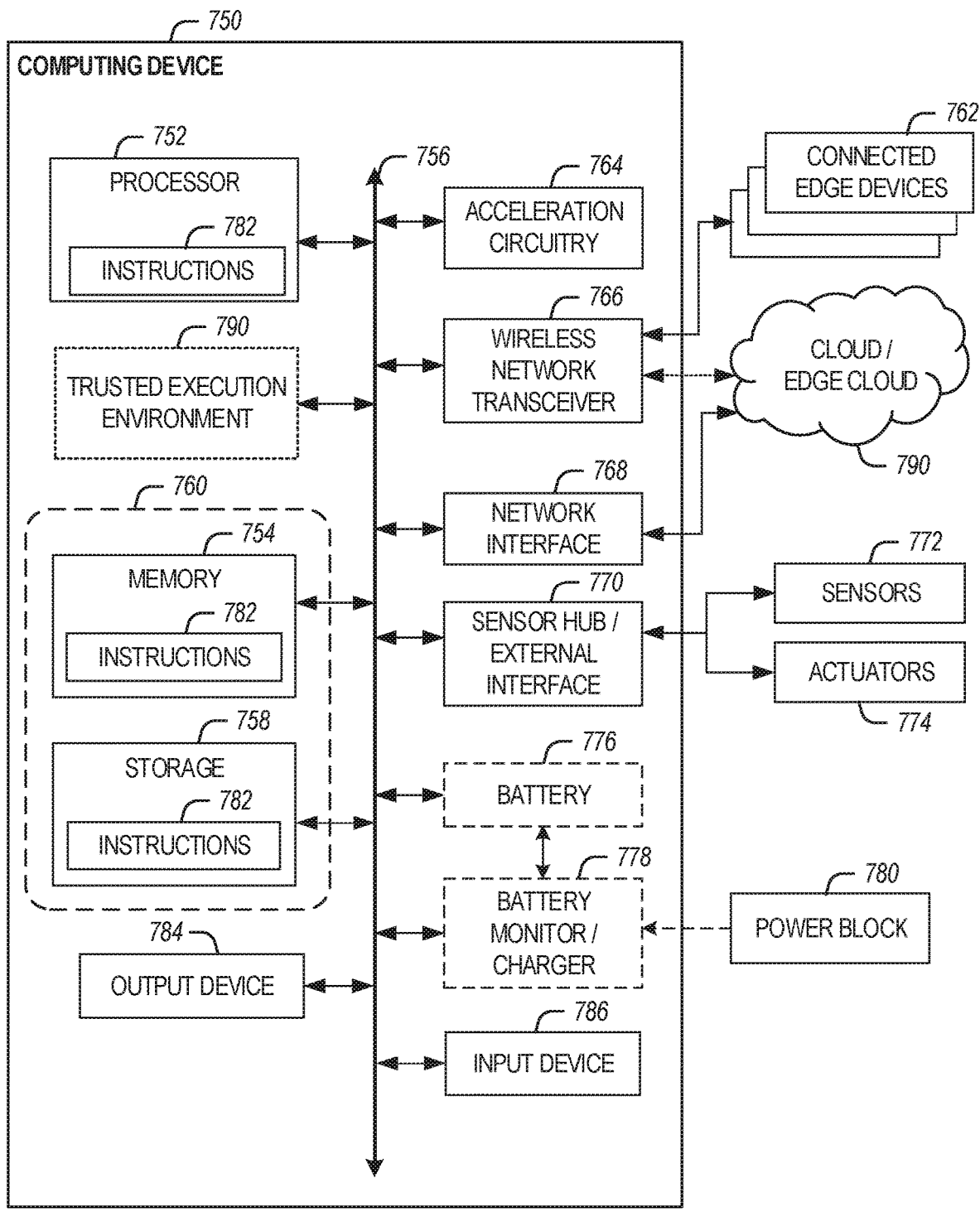
FIG. 7B illustrates a further overview of example components within a computing device, according to an example.

In a more detailed example, FIG. 7B illustrates a block diagram of an example of components that may be present in an edge computing device (or node) 750 for implementing the techniques (e.g., operations, processes, methods, and methodologies) described herein. The edge computing node 750 may include any combinations of the components referenced above, and it may include any device usable with an edge communication network or a combination of such networks. The components may be implemented as ICs, portions thereof, discrete electronic devices, or other modules, logic, hardware, software, firmware, or a combination thereof adapted in the edge computing node 750, or as components otherwise incorporated within a chassis of a larger system.

The edge computing node 750 may include processing circuitry in the form of a processor 752, which may be a microprocessor, a multi-core processor, a multithreaded processor, an ultra-low voltage processor, an embedded processor, or other known processing elements. The processor 752 may be a part of a system on a chip (SoC) in which the processor 752 and other components are formed into a single integrated circuit, or a single package, such as the Edison™ or Galileo™ SoC boards from Intel Corporation, Santa Clara, California. As an example, the processor 752 may include an Intel® Architecture Core™ based processor, such as a Quark™, an Atom™, an i3, an i5, an i7, an i9, or an MCU-class processor, or another such processor available from Intel®. However, any number other processors may be used, such as available from Advanced Micro Devices, Inc. (AMD) of Sunnyvale, California, a MIPS-based design from MIPS Technologies, Inc. of Sunnyvale, California, an ARM-based design licensed from ARM Holdings, Ltd. or a customer thereof, or their licensees or adopters. The processors may include units such as an A5-A12 processor from Apple® Inc., a Snapdragon™ processor from Qualcomm® Technologies, Inc., or an OMAP™ processor from Texas Instruments, Inc.

The processor 752 may communicate with a system memory 754 over an interconnect 756 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 758 may also couple to the processor 752 via the interconnect 756. In an example, the storage 758 may be implemented via a solid-state disk drive (SSDD). Other devices that may be used for the storage 758 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin-transfer torque (STT)-MRAM, a spintronic magnetic junction memory-based device, a magnetic tunneling junction (MTJ) based device, a DW (Domain Wall) and SOT (Spin-Orbit Transfer) based device, a thyristor-based memory device, or a combination of any of the above, or other memory.

In low power implementations, the storage 758 may be on-die memory or registers associated with the processor 752. However, in some examples, the storage 758 may be implemented using a micro hard disk drive (HDD) or solid-state drive (SSD). Further, any number of new technologies may be used for the storage 758 in addition to, or instead of, the technologies described, such resistance change memories, phase change memories, holographic memories, or chemical memories, among others.

The components may communicate over the interconnect 756. The interconnect 756 may include any number of technologies, including industry-standard architecture (ISA), extended ISA (EISA), peripheral component interconnect (PCI), peripheral component interconnect extended (PCIx), PCI express (PCIe), or any number of other technologies. The interconnect 756 may be a proprietary bus, for example, used in an SoC based system. Other bus systems may be included, such as an I2C interface, an SPI interface, point to point interfaces, and a power bus, among others.

The interconnect 756 may couple the processor 752 to a transceiver 766, for communications with the connected edge devices 762. The transceiver 766 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 762. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 766 (or multiple transceivers) may communicate using multiple standards or radios for communications at a different range. For example, the edge computing node 750 may communicate with close devices, e.g., within about 10 meters, using a local transceiver based on BLE, or another low power radio, to save power. More distant connected edge devices 762, e.g., within about 50 meters, may be reached over ZigBee or other intermediate power radios. Both communications techniques may take place over a single radio at different power levels or may take place over separate transceivers, for example, a local transceiver using BLE and a separate mesh transceiver using ZigBee.

A wireless network transceiver 766 (e.g., a radio transceiver) may be included to communicate with devices or services in the edge cloud 790 via local or wide area network protocols. The wireless network transceiver 766 may be an LPWA transceiver that follows the IEEE 802.15.4, or IEEE 802.15.4g standards, among others. The edge computing node 750 may communicate over a wide area using LoRaWAN™ (Long Range Wide Area Network) developed by Semtech and the LoRa Alliance. The techniques described herein are not limited to these technologies but may be used with any number of other cloud transceivers that implement long-range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 766, as described herein. For example, the transceiver 766 may include a cellular transceiver that uses spread spectrum (SPA/SAS) communications for implementing high-speed communications. Further, any number of other protocols may be used, such as Wi-Fi® networks for medium speed communications and provision of network communications. The transceiver 766 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 768 may be included to provide a wired communication to nodes of the edge cloud 790 or to other devices, such as the connected edge devices 762 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, Time Sensitive Networks (TSN), among many others. An additional NIC 768 may be included to enable connecting to a second network, for example, a first NIC 768 providing communications to the cloud over Ethernet, and a second NIC 768 providing communications to other devices over another type of network.

Given the variety of types of applicable communications from the device to another component or network, applicable communications circuitry used by the device may include or be embodied by any one or more of components 764, 766, 768, or 770. Accordingly, in various examples, applicable means for communicating (e.g., receiving, transmitting, etc.) may be embodied by such communications circuitry.

The edge computing node 750 may include or be coupled to acceleration circuitry 764, which may be embodied by one or more AI accelerators, a neural compute stick, neuromorphic hardware, an FPGA, an arrangement of GPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. Accordingly, in various examples, applicable means for acceleration may be embodied by such acceleration circuitry.

The interconnect 756 may couple the processor 752 to a sensor hub or external interface 770 that is used to connect additional devices or subsystems. The devices may include sensors 772, such as accelerometers, level sensors, flow sensors, optical light sensors, camera sensors, temperature sensors, a global positioning system (GPS) sensors, pressure sensors, barometric pressure sensors, and the like. The hub or interface 770 further may be used to connect the edge computing node 750 to actuators 774, such as power switches, valve actuators, an audible sound generator, a visual warning device, and the like.

In some optional examples, various input/output (I/O) devices may be present within or connected to, the edge computing node 750. For example, a display or other output device 784 may be included to show information, such as sensor readings or actuator position. An input device 786, such as a touch screen or keypad may be included to accept input. An output device 784 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the edge computing node 750.

A battery 776 may power the edge computing node 750, although, in examples in which the edge computing node 750 is mounted in a fixed location, it may have a power supply coupled to an electrical grid. The battery 776 may be a lithium-ion battery, or a metal-air battery, such as a zinc-air battery, an aluminum-air battery, a lithium-air battery, and the like.

A battery monitor/charger 778 may be included in the edge computing node 750 to track the state of charge (SoCh) of the battery 776. The battery monitor/charger 778 may be used to monitor other parameters of the battery 776 to provide failure predictions, such as the state of health (SoH) and the state of function (SoF) of the battery 776. The battery monitor/charger 778 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 778 may communicate the information on the battery 776 to the processor 752 over the interconnect 756. The battery monitor/charger 778 may also include an analog-to-digital (ADC) converter that enables the processor 752 to directly monitor the voltage of the battery 776 or the current flow from the battery 776. The battery parameters may be used to determine actions that the edge computing node 750 may perform, such as transmission frequency, mesh network operation, sensing frequency, and the like.

A power block 780, or other power supply coupled to a grid, may be coupled with the battery monitor/charger 778 to charge the battery 776. In some examples, the power block 780 may be replaced with a wireless power receiver to obtain the power wirelessly, for example, through a loop antenna in the edge computing node 750. A wireless battery charging circuit, such as an LTC4020 chip from Linear Technologies of Milpitas, California, among others, may be included in the battery monitor/charger 778. The specific charging circuits may be selected based on the size of the battery 776, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 758 may include instructions 782 in the form of software, firmware, or hardware commands to implement the techniques described herein. Although such instructions 782 are shown as code blocks included in the memory 754 and the storage 758, it may be understood that any of the code blocks may be replaced with hardwired circuits, for example, built into an application-specific integrated circuit (ASIC).

In an example embodiment, the instructions 782 provided via memory 754, the storage 758, or the processor 752 may be embodied as a non-transitory, machine-readable medium 760 including code to direct the processor 752 to perform electronic operations in the edge computing node 750. The processor 752 may access the non-transitory, machine-readable medium 760 over the interconnect 756. For instance, the non-transitory, machine-readable medium 760 may be embodied by devices described for the storage 758 or may include specific storage units such as optical disks, flash drives, or any number of other hardware devices. The non-transitory, machine-readable medium 760 may include instructions to direct the processor 752 to perform a specific sequence or flow of actions, for example, as described with respect to the flowchart(s) and block diagram(s) of operations and functionality depicted above. As used in, the terms "machine-readable medium" and "computer-readable medium" are interchangeable.

In an example embodiment, computing device 750 can be implemented using components/modules/blocks 752-786 which are configured as IP Blocks. Each IP Block may contain a hardware RoT (e.g., device identifier composition engine, or DICE), where a DICE key may be used to identify and attest the IP Block firmware to a peer IP Block or remotely to one or more of components/modules/blocks 762-780.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Each of the block diagrams of FIGS. 7A and 7B are intended to depict a high-level view of components of a device, subsystem, or arrangement of an edge computing node. However, it will be understood that some of the components shown may be omitted, additional components may be present, and a different arrangement of the components shown may occur in other implementations.

Example of Multi-Tenant Data Protection Using a Platform Resource Manager with Shared Memory Access In the context of a deployed system (such as the IoT system depicted in FIG. 4, the MEC system depicted in FIG. 5, the edge computing system depicted in FIG. 6, or like variations of distributed computing architectures) the present techniques and configurations provide the capability for a multi-tenant data protection using shared memory access.

FIG. 8 illustrates a block diagram of an Edge-as-a-Service (EaaS) architecture 800 using a platform resource manager with shared memory access (PRM SMA) 822, according to an example. The EaaS architecture 800 includes client compute nodes 802, 804, . . . , 806 communicating with a plurality of edge devices (or nodes) operating as part of node clusters in different edge layers. For example, node cluster 808 includes edge devices associated with an edge devices layer, which may be similar to layer 620 in FIG. 6. Node cluster 810 includes edge devices associated with a network access layer, which may be similar to layer 630 in FIG. 6. Node cluster 812 includes edge devices associated with a core network layer, each may be similar to layer 640 in FIG. 6. A core server (e.g., a server similar to the core data center 632 in FIG. 6) is may be part of the node cluster 812. The global network cloud 814 may be located at a cloud data center layer (e.g., similar to layer 650 in FIG. 6).

Although an illustrative number of client compute nodes 802, 804, . . . , 806, edge devices in node clusters 808, 810, 812, and a global network cloud 814 are shown in FIG. 8, it should be appreciated that the EaaS architecture 800 may include more or fewer devices or systems at each layer. Additionally, the number of components of each layer (e.g., the layers of node clusters 808, 810, and 812) may increase at each lower level (i.e., when moving closer to endpoints).

Consistent with the examples provided herein, each of the client compute nodes 802, 804, . . . , 806 may be embodied as any type of end point component, device, appliance, or "thing" capable of communicating as a producer or consumer of data. Further, the label "node" or "device" as used in the EaaS architecture 800 does not necessarily mean that such node or device operates in a client or slave role; rather, any of the nodes or devices in the EaaS architecture 800 refer to individual entities, nodes, or subsystems which include discrete or connected hardware or software configurations to facilitate or use the edge cloud 110.

In conventional cloud-hosted processing solutions, client node 802 may encode cleartext data 816 to generate ciphertext and communicate the generated ciphertext via a ciphertext pipe 818 to the global network cloud 814 for processing (e.g., decoding the ciphertext back into cleartext data 816) and completing the workload using a cloud-hosted solution. In some aspects of the conventional cloud-hosted processing solutions, hop-by-hop encryption or homomorphic encryption may be applied by some of the edge devices used by the ciphertext pipe 818. With homomorphic encryption, the traversing data or metadata may remain encrypted along the ciphertext pipe 818, but some EaaS services executing on the edge devices associated with the ciphertext pipe may apply cryptographic transformations of the data to achieve a focused benefit. For example, encrypted values could be added resulting in a new encrypted value, but where the EaaS service need not share an end-to-end encryption key. Homomorphic encryption traditionally uses very large keys that occupy added storage and processing overhead. Consequently, the above aspects associated with the communication of ciphertext via the ciphertext pipe 818 require each edge device participating in the workload processing to share encryption/decryption keys. Such sharing complicates key management, especially in aspects where the ciphertext pipe 818 traverses through a large number of edge devices within multiple node clusters.

In an example embodiment, the sharing of keys may not be needed when using homomorphic encryption as intermediate nodes can apply a function on ciphertext data without decrypting the data. In this regard, only the endpoints (e.g., 814 and 802-806) may be required to have possession of a homomorphic key. In another embodiment, the nodes used for the ciphertext pipe may have possession of keys as well as cleartext data and, therefore, are inside the trust boundary for nodes 802-806 and 814 (or similar "endpoints").

In an example embodiment, the EaaS architecture 800 can include a PRM SMA 822 (which can be the same as PRM SMA 902 in FIG. 9) to provide hardware-based fine-grained memory access configurations to allow different types of secure data sharing across different edge devices within the EaaS architecture 800. More specifically, the PRM SMA 822 comprises suitable circuitry, logic, interfaces, and/or code and is configured to provide different levels of data sharing that can depend on the level of trust with respect to one or more other edge devices within the node clusters 808, 810, and 812. In this regard, the PRM SMA 822 provides a more comprehensive and flexible way to expose information to edge peers within the EaaS architecture 800.

In an example embodiment, tenants may describe their data sharing requirements (e.g., as part of an SLA provided to an orchestrator) according to specific address space, memory, and storage sharing capabilities. Example memory region types (or memory access modes) that can be configured by the PRM SMA 822 can include the following four types:

(a) Open memory (or open mode). A memory region configured as open memory can be used for sharing data in "raw mode." In open mode, a particular region of memory can be used by two or more tenants to share an encrypted address range where each tenant has both read and write privileges available. In an example embodiment, metadata instrumentation labels workload data objects according to expected or allowable data use semantics. For example, data that is expected to be used in open mode sharing scenarios may include metadata tagging it as such.

In an example use case scenario for open memory, a first edge computing device (ECD1) may overflow the physical memory. Rather than applying a paging/swapping scheme using the memory hierarchy, ECD1 instead allocates a peer ECD (ECD2) a shared distributed memory resource. The function or sub-routine/inner loop function is migrated/scheduled on ECD2 and results cached. ECD1 is then able to collect intermediate results, and ECD2 feeds temporary results (inner loop results) into ECD1 that iterates the outer-loop function.

(b) Protected memory (or protected mode). In a memory region configured as protected memory, data is protected by a single-tenant using data protection technologies (e.g., software guard extensions (SGX), multi-key total memory encryption (MKTME) or other protection technologies) to isolate data to a trusted execution environment (TEE) when in the clear and encrypt it end-to-end otherwise. Data that is not expected to be shared across tenants may have metadata designation as a protected mode.

In an example use case scenario for protected memory, a media transcode workload may be scheduled across multiple ECDs, where a first ECD performs a first stage transcode pipeline, a second ECD performs a second stage transcode pipeline and so forth, each using protected memory.

(c) Shared memory (or shared mode). In a memory region configured as shared memory, data within a particular address range can be shared securely across a set of tenants and specific applications (e.g., an application executing in a container or multiple containers forming an edge service instance) represented with their corresponding process address space ID (PASID). In this regard, PASID can be indicative of a specific application or edge service instance. In an example embodiment, a PASID may be a global PASID so that it may be identified and used across multiple edges.

In an example use case scenario for sharing memory, a shared memory page can be allocated by a memory controller of the PRM SMA where the shared memory page allocation can be identified by a PASID such that multiple ECDs can cooperate (e.g., in a cluster server use case) to share the workload execution knowing which context protects the execution. In this regard, the same ECD may participate in a different PASID context for a different SLA involving a different tenant/user and not be confused about which memory belongs to which SLA.

(d) Shared protected memory (or shared protected mode). In a memory region configured as shared protected memory, data within a particular address range uses homomorphic encryption to both protect the data (and metadata of the data, such as owner of a document, etc.) as well as to allow sharing for a well-defined set of data transformations that can be performed on the encrypted data.

Data that is designated for shared protected mode by the workload metadata may also have metadata that identifies the type of homomorphic encryption operations that are permitted. Such operations may include a single instance of Boolean addition or multiplication operations, combinations of operations with a fixed depth, and combinations of operations with unlimited depth.

In some embodiments, each of the preceding types of data may include metadata tagging it with the data type, which can be used in storing such data in the appropriate memory region.

In an example use case scenario for shared protected memory, encrypted data can be operated on in specific well-defined ways. For example, additive homomorphic encryption allows two encrypted values or a scalar value and an encrypted value to be added together, result in a new ciphertext without the entity performing addition operation having the encryption key. Additive homomorphic encryption may be useful for voting schemes associated with reputation records. For example, tenants may increment a ballot of reputation records pertaining to a stakeholder such as an edge service provider node. There are privacy advantages that limit a competitor's ability to observe or infer tenant behavior based on the pattern of updates to a reputation record. In another example embodiment, shared protected memory may be used in connection with telemetry collection. More specifically, telemetry data can use additive homomorphic encryption to count security, failure, and audit events across multi-stakeholder service deployments without requiring a trusted telemetry collection system.

The PRM SMA 822 is configured (e.g., as described in connection with FIG. 9 and FIG. 10) to communicate with an orchestrator (or another trusted node) to integrate and manage the above memory access modes in a remote and trusted way. More specifically, the PRM SMA 822 can include interfaces and logic in order to allow for different edge tenant and different applications for those particular tenants to share specific memory regions in a secure way. For example, the PRM SMA 822 can include out of band interfaces that are accessible only to the orchestration layer and the platform software. By using the shared memory access configured by the PRM SMA 822, the total demand for tenant-specific storage resources may be reduced. Additionally, shared data may be cached/replicated using caching and replication techniques (e.g., as discussed in connection with FIG. 11) that reduce the need for additional resources while improving workload performance and reliability.

In an example embodiment, after the cleartext data 816 is encoded and ciphertext is generated, the ciphertext may be communicated via ciphertext pipe 820, taking advantage of shared memory access and secure data processing by multiple nodes in node cluster 808, as may be configured by the PRM SMA 822. More specifically, the PRM SMA 822 may configure secure sharing of one or more memory regions as well as performing one or more functions (e.g., homomorphic encryption or data transformations) by nodes within the node cluster 808 for edge-hosted workload processing associated with the ciphertext. In aspects when the PRM SMA 822 configures each of the nodes associated with ciphertext pipe 820 with secure keys and/or secure data sharing using one or more memory regions, the client node 802 to communicate cleartext data and encoding/encryption or decoding/decryption can be performed at any of the trusted nodes along the ciphertext pipe 820 configured by the PRM SMA 822.

FIG. 9 is a block diagram illustrating a PRM SMA 902, according to an example. Referring to FIG. 9, the PRM SMA 902 can include metadata interpreter 918 and interfaces 910, 912, and 914. The PRM SMA 902 uses a first interface 910 to communicate with an orchestrator node 904 to receive one or more SLOs 922. In an example embodiment, the SLOs 922 can specify KPIs at the granularity of individual containers or edge services. More specifically, the SLOs 922 can define the usage of an accessible feature (e.g., a resource or service) associated with an edge computing device. An edge service can be represented by at least one edge service instance that includes include multiple containers. In this regard, an SLO that is associated with an edge service can provide KPIs at the granularity of an edge service instance (e.g., KPIs are associated with the multiple containers of the edge service instance that represents the edge service) or at the granularity of an individual container (e.g., KPIs are associated with an individual container of the multiple containers of the edge service instance).

Even though FIG. 9 illustrates the network entity 904 that provides the one or more SLOs 922 to the PRM SMA 902 as an orchestrator, the disclosure is not limited in this regard and other types of network entities may perform this functionality. For example, the network entity 904 can be a master device, a trusted node, or another type of edge computing device configured to provide the SLOs to the PRM SMA 902.

The PRM SMA 902 further includes interface 912, which can be used for communication with platform software 906 to obtain resource availability 924. Platform software 906 can include an edge computing device operating system, a hypervisor, or other types of platform software configured to communicate the resource availability 924 to the PRM SMA 902 via interface 912. In an example embodiment, platform software 906 can communicate with the PRM SMA 902 via a sideband application programming interface (API) or another type of API. The sideband API may be available primarily to the operating system and/or hypervisor software. Using the sideband API, drivers for various hardware resources in an edge platform (e.g., edge computing device) may communicate the availability and non-availability of resources to PRM SMA 902. The majority of static resources, such as the available memory bandwidth or cache capacity, or power and thermal limits of the platform, may be communicated to PRM SMA 902 through a PRM driver that initializes the PRM SMA during the boot phase.

After the PRM SMA 902 receives the one or more SLOs 922 from the orchestrator node 904, the metadata interpreter 918 (or another circuit within the PRM SMA 902) performs mapping/translation functions 916 to map (or translate) the defined usage of the accessible feature as specified by the one or more SLOs 922 to a plurality of feature controls 926 (e.g., low-level resource controls). In an example embodiment, the metadata interpreter 918 uses a computation model 930 or one or more lookup tables (LUTs) 920 to perform the mapping/translation functions. In some embodiments, computation model 930 is generated by a deep learning training architecture or another machine learning architecture.

The PRM SMA 902 uses interface 914 to set the determined feature controls 926 (e.g., a set of lower-level controls or "knobs") on the available platform resources 908. The PRM SMA 902 then monitors the platform resources 908 based on the set feature controls 926 to obtain feature utilization information 928. If the feature utilization information 928 indicates noncompliance with the one or more SLOs 922, remedial action can be performed. The remedial action can include adjusting the mapping/translation functions 916, adjusting the allocation of the platform resources 908 (e.g., platform resources used by an edge computing device to execute a container or an edge service associated with the SLOs), or adjust one or more weights associated with the computation model 830.

Figure 11:
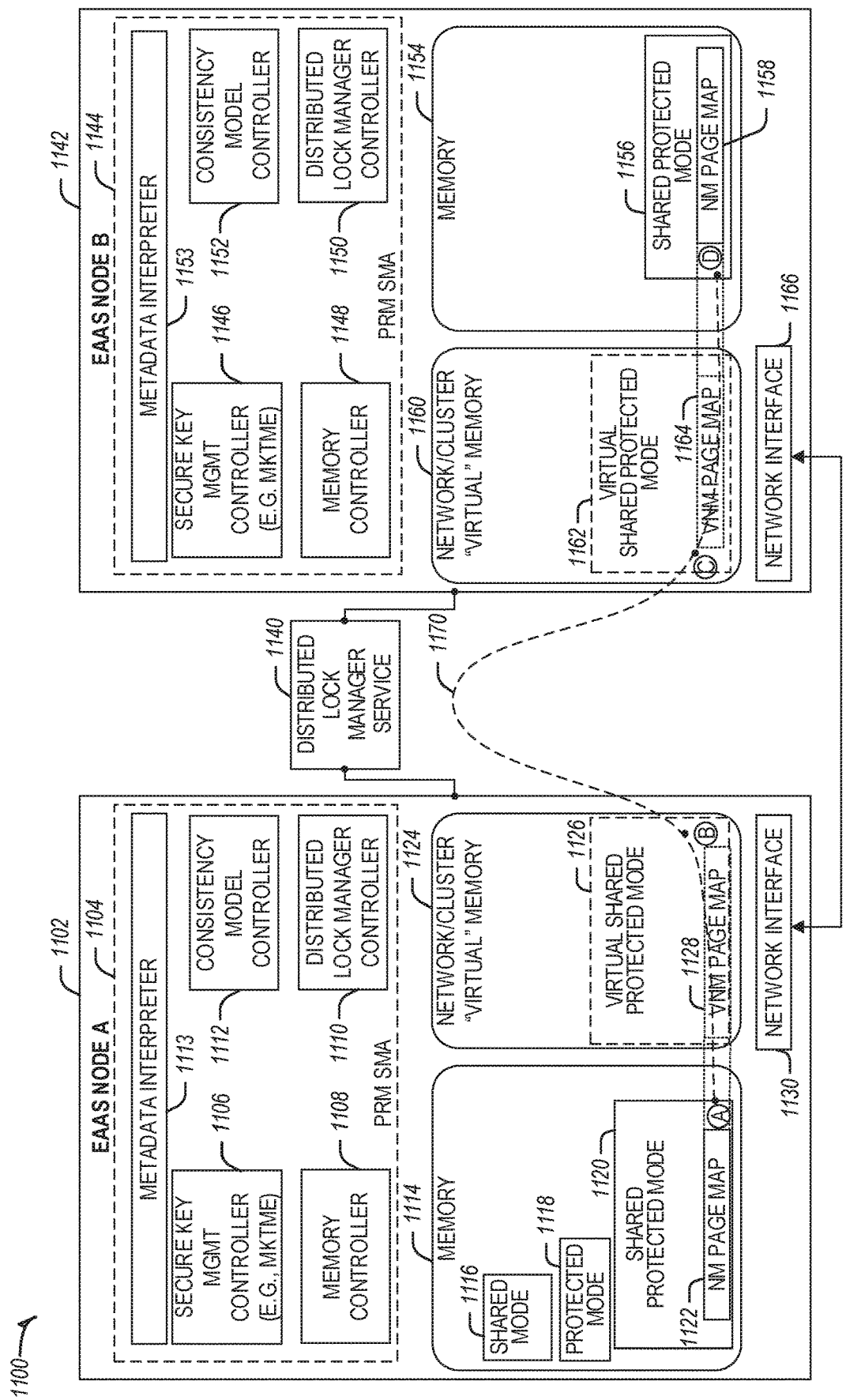
FIG. 11 illustrates a block diagram of edge computing devices using virtual memory to ensure consistency between shared memory regions, according to an example.

In an example embodiment, the orchestrator—user interactions are represented by an SLA, while orchestrator—PRM interactions are represented by an SLO. The SLO (e.g., 922) can inform the PRM SMA 902 of a workflow execution plan by informing the PRM SMA what constitutes success criteria, i.e., the "objective". The PRM SMA 902 can use the metadata interpreter 918 to decompose the workflow into workloads that run on instances of an ECD and to obtain workload metadata. The workload metadata may include a machine-readable expression (e.g. CDDL, ASN.1, JSON, or other types of expressions) that maps the SLO objective into concrete KPIs for executing the workload. The metadata interpreter 918 can further decompose the workloads into "functions". One type of function is a "homomorphic function" where the function can be applied to homomorphically encrypted data. In some aspects, the memory and compute resources used to perform the workload functions are isolated according to the SLA definition of "tenant" (i.e., the user/group agreeing to the terms of the SLA contract). Therefore, the shared memory configuration may be a resource reservation mechanism that associates the resource (possibly spanning multiple ECDs as seen in FIG. 11) with the tenant(s) under the SLA. The metadata interpreter 918 may perform the SLO decomposition (e.g., SLA→SLO→Workflow→Workload→Function→sub-routine→outer-loop→inner-loop→execution). In some aspects, there may be other functions that are not using homomorphic-encrypted data that operate on cleartext data. Other types of functions that may be specified by the SLO 922 include FaaS functions, Named Function Networking (NFN) functions, XasS, etc. Additional functions that may be specified by the SLO 922 include content encode/decode/transcode, data storage/retrieval, financial computation functions, such as Monte Carlo simulations, engineering applications/simulations, etc.

In an example embodiment, the PRM SMA 902 can use the metadata interpreter 918 to translate workload metadata and obtain additional information that may be needed to manage encryption keys (e.g., by a secure key management controller such as controller 1008 in FIG. 10) or to manage distributed shared memory resources (e.g., by a distributed lock manager controller such as controller six in FIG. 10). In an example embodiment, the PRM SMA 902 may receive multiple metadata structures from the orchestrator 904, wherein at least one of the metadata structures is separate from the workflow metadata but where the tenant isolation context is known and enforced by the PRM SMA 902.

In an example embodiment, the SLO 922 provided by the orchestrator 904 can be translated/interpreted by the metadata interpreter 918 to obtain workload metadata and corresponding workload configuration information that identifies memory access configurations for configuring shared memory regions (e.g., 934 in FIG. 9, 1014 in FIG. 10, or 1116-1120 in FIG. 11) and service authorizations (collectively, 919) identifying edge service instances and/or edge computing devices authorized to access one or more shared memory regions 934 in memory 932. The memory access configurations and service authorizations are discussed in greater detail in connection with FIG. 10. Even though the PRM SMA 902 is illustrated to include only the metadata interpreter 918, the disclosure is not limited in this regard and other circuitry, such as a distributed lock manager controller, a secure key management controller, a memory controller, a consistency model controller, or other types of controls may also be included as part of the PRM SMA (e.g., as illustrated in FIG. 10 and FIG. 11) or such controllers can be implemented separately from the PRM SMA.

FIG. 10 is a diagram illustrating an edge computing device 1000 using a PRM SMA 1002 and secure key storage in connection with providing multiple edge tenants different types of secure shared access to memory regions, according to an example. Referring to FIG. 10, the edge computing device (ECD) 1000 can be one of the EaaS nodes illustrated in FIG. 8, and may include a PRM SMA 1002, memory 1012, secure key storage 1016, and a network interface 1018. The network interface 1018 can include one or more interfaces for communicating with other edge computing devices, as well as interfaces 910-914 in FIG. 9. The PRM SMA 1002 and the metadata interpreter 1004 may be similar to the PRM SMA 902 and the metadata interpreter 918 in FIG. 9.

The PRM SMA 1002 includes a metadata interpreter 1004, a distributed lock manager (DLM) controller 1006, a secure key management controller 1008, and a memory controller 1010. The DLM controller 1006 comprises suitable circuitry, logic, interfaces, and/or code and is configured to coordinate protected accesses across an edge cluster or selection of FaaS services. In example aspects, the DLM controller 1006 works with a DLM service that coordinates/orchestrates multiple EaaS nodes (e.g., EaaS microservice nodes).

The secure key management controller 1008 comprises suitable circuitry, logic, interfaces, and/or code and is configured to configure and manage secure keys stored in the secure key storage 1016. In an example embodiment, secure keys may be received from a secure IP server (not illustrated in FIG. 10) and may be stored as part of an authorization table, such as table 1050 stored the secure key storage 1016.

In an example operation, the edge computing device 1000 includes one or more interfaces (e.g., as illustrated in FIG. 9) that can be exposed to the orchestration and management layer (which may be running in a trusted IP server) as out of band interfaces. Such interfaces may be used for registering new homomorphic functions and registering shared memory configurations across one or multiple talents. More specifically, PRM SMA 1002 can receive one or more SLOs which can be interpreted by the metadata interpreter 1004 to obtain workload configuration information (e.g., configuration information 919 in FIG. 9). The workload configuration information can identify memory access configurations as well as surface stations indicating at least one of the following: a tenant, an edge computing device, an edge service instance, a container, an application, or function authorized to access the memory access configurations.

In an example embodiment, the memory access configurations include a homomorphic function identification (ID) as well as the bitstream implementing the function, which information can be used by the memory controller 1010 to register such function with the edge computing device 1000 and storage in the authorizations table 1050. The PRM SMA 1002 (or the orchestrator node) may recognize opportunities for using homomorphic functions based on the SLO. For example, the SLO may require "encrypted" or "protected" content when in movement, storage, and execution. The options for execution protection may also include using a trusted execution environment, such as Intel's software guard extensions (SGX), ARM Trust Zone, AMD's Secure Encrypted Virtualization (SEV), or execution protection can be achieved using homomorphic functions. If the workload function (after the workload metadata is translated) is found on a list of available homomorphic functions, then it can be selected instead of a list of functions available via a TEE.

In an example embodiment, the orchestrator may determine which functions to include in the workload metadata when an execution plan for a client workload is determined based on an SLA. Additionally, the orchestrator can determine the types of shared memory that can be used for the client workload as well as other resources, such as ECDs, edge service instances, applications, etc. that can have access to the shared memory and perform one or more of the specified functions. In an example embodiment, the memory access configurations can be used by the PRM SMA 1002 for setting up an execution environment using shared memory regions and homomorphic functions (or other types of functions such as named function networking (NFN) functions.

In an example embodiment, the memory access configurations can include the following information which can be used by the memory controller 1010 to partition memory 1012 into memory regions 1014 (or 1116-1120 in FIG. 11) and register new shared memory configurations across one or multiple tenants:

(a) A memory range that corresponds to a portion of memory 1012 that will be shared across different services from different tenants, as well as information identifying a type of memory access that can be configured for the memory range (e.g., one of the four memory access types discussed hereinabove). The memory region type may be included in column 1058 and the memory range be included in column 1060 of the authorization table 1050.

(b) A list of tenants (and/or ECDs) that are allowed to access the registered functions (e.g., homomorphic or other types of functions). A tenant (or ECD) can be represented by a particular ID, as indicated in column 1052 in the authorization table 1050. The tenant ID may be a global tenant ID which may be used across multiple edges.

(c) A list of PASIDs (e.g., global PASIDs that may be valid across multiple edges) within each of the tenants that can access to a particular memory region. In some aspects, a PASID may be associated with an application, a container, an edge service instance, or a function executing within an ECD of the tenant. The list of PASIDs may be included in column 1054 of the authorization table 1050.

(d) One or more secure keys that need to be used in connection with accessing manipulating information stored in the designated memory range. Such secure keys may be further updated by the secure key management controller 1008 or by a remote secure IP server. The secure keys may be included in column 1056 of the authorization table 1050.

(e) A memory range that a particular PASID and/or tenant can access. In some aspects, a memory range is configured as private and will be accessible only by a single tenant. In some aspects, a memory range can be specified as plain access or homomorphic access. In the latter case, the registration by the memory controller (e.g., in authorizations table 1050) may specify a list of functions that can be used by the PASID and a tenant (or ECD) ID. In some aspects, the specified memory range can be both pages that are local to a platform (e.g., private pages) or pages assigned to distributed shared memory use (e.g., protected mode). When pages assigned to distributed shared memory are used, the workload metadata may also include a policy that limits the sharing to only a single named tenant.

In an example embodiment, the memory access configuration information is stored in the authorizations table 1050 as part of the secure key storage 1016. In other aspects, the memory access configuration information can be stored within the memory controller 1010 and can be implemented as a system address decoder.

In an example embodiment, the memory controller 1010 can include logic that can be used to configure the different memory regions (e.g., 1014 in FIG. 10 or 1116-1120 in FIG. 11) for shared memory access using the memory access configuration information. In an example embodiment, memory controller 1010 can receive a memory access request for accessing a particular memory address @a. The memory controller 1010 may determine whether the memory address belongs to any of the memory ranges tracked inside the multi-tenant shared address space (e.g., any of the memory ranges specified in the authorizations table 1050 for memory regions 1014). If the memory address does not belong to any of the configured shared memory, the memory access request can be processed as a conventional memory access request using standard memory access flows. If the memory address belongs to a configured shared memory (e.g., a memory region operating in open mode, protected mode, shared mode, or shared protected mode), the memory controller 1010 identifies whether the PASID and the tenant ID (e.g., as accessed from the authorizations table 1050) that have access to the memory space indicated by the received address (if such entry does not exist in the authorizations table, a software interrupt or a page fault maybe generated). If the memory controller 1010 locates an entry based on the PASID, the tenant ID, and the memory address @a, access to the address @a is performed depending on the type of shared address space (e.g., as indicated by column 1058 in the authorizations table 1050). In shared plain mode, the read or write access is performed without applying any additional processing functions. In shared homomorphic mode, the read or write request is performed through homomorphic logic (which can be part of the memory controller 1010), using the corresponding function ID attached to the received memory access request. If the function attached to the memory access request is not allowed to the tenant, an error is generated. In some aspects associated with shared mode, different memory access modes may be implemented (e.g., allowing a particular PASID and tenant to access a particular address space in read mode only).

FIG. 11 illustrates a block diagram 1100 of edge computing devices 1102 and 1142 using virtual memory to ensure consistency between shared memory regions, according to an example. Referring to FIG. 11, ECD 1102 (or EaaS node A) includes a PRM SMA 1104, memory 1114, network/cluster virtual memory space 1124, and a network interface 1130. The PRM SMA 1104 includes a metadata interpreter 1113, a secure key management controller 1106, a memory controller 1108, a distributed lock manager controller 1110, and a consistency model controller 1112. The metadata interpreter 1113 and controllers 1106-1110 can have similar functions to, respectively, metadata interpreter 1004 and controllers 1006-1010 in FIG. 10. The consistency model controller (CMC) 1112 comprises suitable circuitry, logic, interfaces, and/or code and is configured to coordinate a data consistency model. The CMC 1112 may specify a contract between a programmer and a telecommunications system, where the system guarantees that if the programmer follows programming rules, the memory will be consistent and the result of reading, writing, or updating memory will be predictable.

Memory 1114 may be partitioned for shared access, including memory regions 1116 (for shared mode), 1118 (for protected mode), and 1120 (for shared protected mode). The shared protected mode memory region 1120 includes a network memory page mapping function 1122, which is configured to map the shared protected mode memory region 1120 to the virtual shared protected mode region of memory 1126 in the network/cluster virtual memory space 1124 (or to another memory region). Even though only the shared protected mode memory region 1120 is illustrated as including a mapping function, the disclosure is not limited in this regard and the other memory regions (e.g., 1116 and 1118) can also include mapping functions that map the corresponding regions into regions within the virtual memory space 1124.

ECD 1142 (or EaaS node B) includes a PRM SMA 1144, memory 1154, network/cluster virtual memory space 1160, and a network interface 1166. The PRM SMA 1144 includes a metadata interpreter 1153, a secure key management controller 1146, a memory controller 1148, a distributed lock manager controller 1150, and a consistency model controller 1152. The metadata interpreter 1153 and controllers 1146-1152 can have similar functions to, respectively, metadata interpreter 1113 and controllers 1106-1112 in ECD 1102.

Memory 1154 may be partitioned for shared access, including memory regions 1156 (for shared protected mode) as well as other memory regions (not illustrated in memory 1154) for shared mode, for protected mode, or any other memory access mode that may be configured by the memory controller. The shared protected mode memory region 1156 includes a network memory page mapping function 1158, which is configured to map the shared protected mode memory region 1156 to the virtual shared protected mode region 1162 in the network/cluster virtual memory space 1160 (or to another memory space). Even though only the shared protected mode memory region 1156 is illustrated as including a mapping function, the disclosure is not limited in this regard and other memory regions within memory 1154 can also include mapping functions that map the corresponding regions into regions within the virtual memory space 1160 or other memory space.

In an example embodiment, the virtual memory space 1124 includes a virtual network memory page mapping function 1128, which may be used to map the virtual shared protected memory 1126 to virtual memory spaces of other ECDs (e.g., ECD 1142) via the distributed lock manager service 1140 and the virtual network memory page mapping function 1164 of the virtual shared protected memory 1162. For example, the mapping/replication of data from the shared protected memory 1120 in ECD 1102 to the shared protected memory 1156 in ECD 1142 is illustrated with communication path 1170 associated with time instances A-D. At time instance A, memory controller 1108 can store data in the shared protected memory 1120, and the mapping function 1122 replicates the data to the virtual shared protected memory 1126 in the virtual memory space 1124. At time instance B, mapping function 1128 detects the presence of new data in the virtual shared protected memory 1126 and replicates the data via the distributed lock manager service 1140 and the network interfaces 1130 and 1166 to the virtual shared protected memory 1162 in the virtual memory space 1160 of ECD 1142. At time instance C, the virtual network memory page mapping function 1164 replicates the received data into the shared protected memory 1156 of memory 1154. In this regard, the above data replication techniques using virtual memory spaces and mapping functions may be used to ensure consistency/uniformity of shared memory configurations between multiple edge computing devices in node clusters.

Figure 12:
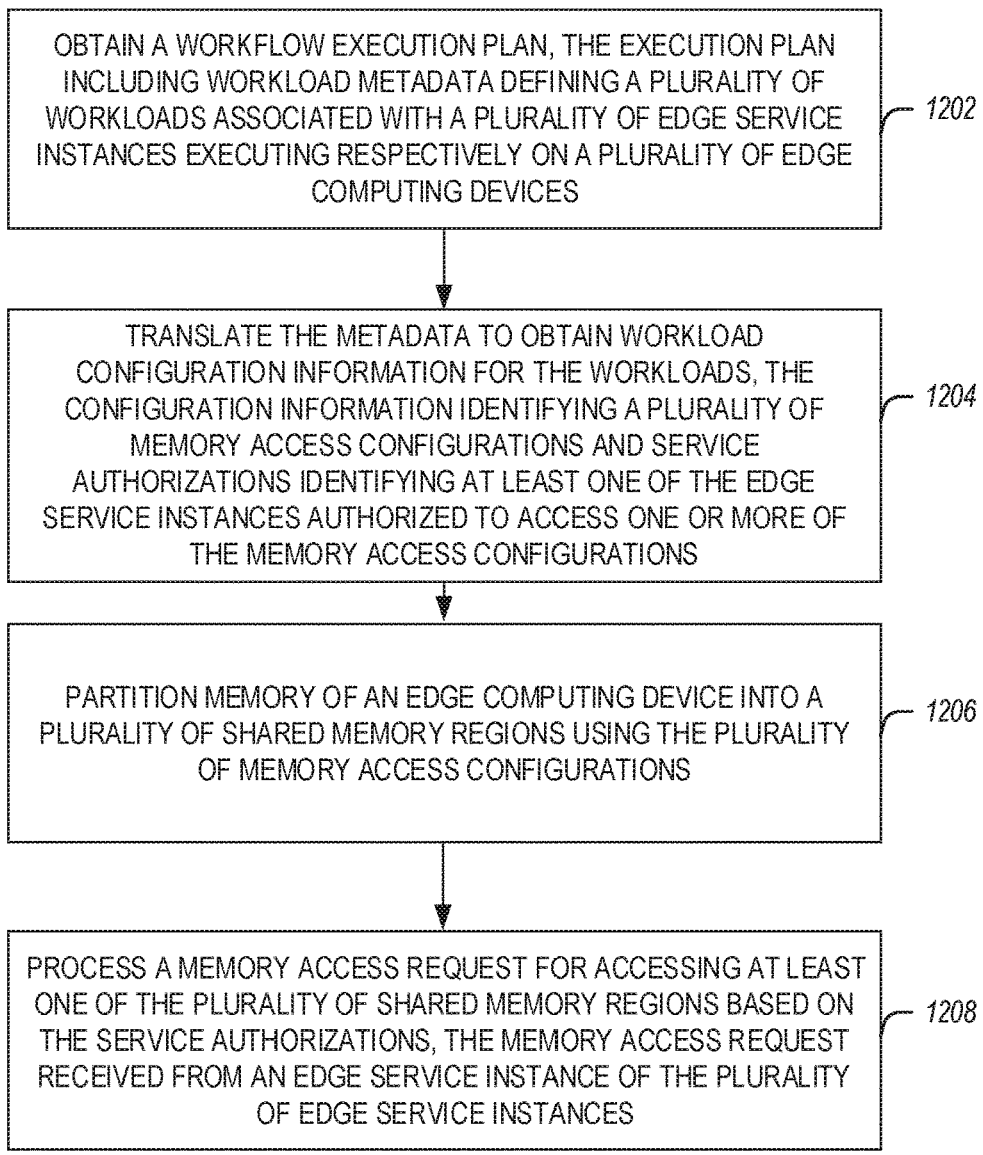
FIG. 12 illustrates a flowchart of an example method for processing memory access requests using shared memory regions, according to an example.

FIG. 12 illustrates a flowchart of an example method for processing memory access requests using shared memory regions, according to an example. The example method 1200 includes operations 1202, 1204, 1206, and 1208 which can be performed by the PRM SMA 902 of FIG. 9 (or any of the other PRM SMAs discussed herein).

At operation 1202, a workflow execution plan may be obtained from an orchestration provider. For example, the PRM SMA 1002 may receive SLOs from an orchestrator node (e.g., orchestrator 904). The workflow execution plan may include workload metadata defining a plurality of workloads associated with a plurality of edge service instances executing respectively on a plurality of edge computing devices within an edge computing system. For example, orchestrator 904 can communicate SLOs 922 associated with a workflow execution plan for a client node, the workflow execution plan including the workflow metadata.

At operation 1204, the workload metadata is translated to obtain workload configuration information for the plurality of workloads. For example, the PRM SMA 902 can use the metadata interpreter 918 to translate the workload metadata using mapping/translation functions 916 to obtain the workload configuration information. The workload configuration information identifies a plurality of memory access configurations and service authorizations (e.g., 919) identifying at least one edge service instance of the edge service instances authorized to access one or more of the plurality of memory access configurations. For example, the memory access configurations 919 can include configuration information that may be used by a memory controller to configure the shared memory access regions (e.g., memory controller 1010 configures the shared memory access regions as discussed in connection with FIG. 10). The service authorizations can include an indication of a tenant, ECD, application, edge service instance, etc. that can be used by the memory controller (e.g., 1010) to configure shared memory access (e.g., based on authorizations table 1050 which includes column 1052 of tenant IDs and column 1054 of PASIDs).

At operation 1206, the memory of the edge computing device is partitioned into a plurality of shared memory regions (e.g., 1014) using the plurality of memory access configurations (e.g., using the authorizations table 1050 generated using the memory access configurations and service authorizations obtained based on the workload metadata). At operation 1208, a memory access request for accessing at least one of the plurality of shared memory regions is processed based on the service authorizations. For example, the memory controller 1010 may receive a memory access request from an edge service instance of a plurality of edge service instances associated with a client workload and may process the memory access request based on the authorizations table 1050 as well as additional information that may be received with the request (e.g., function identification to be performed in connection the memory access request, identification of a tenant or ECD requesting the access, a memory range, etc.).

Even though techniques discussed herein are associated with a container executing on a virtual machine, the disclosure is not limited in this regard and the discussed techniques also apply to any process, application, edge service instance, container, VM, or another processing context.

Implementation of the preceding techniques may be accomplished through any number of specifications, configurations, or example deployments of hardware and software. It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field-programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

ADDITIONAL NOTES & EXAMPLES

Additional examples of the presently described method, system, and device embodiments include the following, non-limiting configurations. Each of the non-limiting examples may stand on its own or may be combined in any permutation or combination with any one or more of the other examples provided below or throughout the present disclosure.

Example 1 is a system comprising: memory; and processing circuitry coupled to the memory, the processing circuitry configured to obtain, from an orchestration provider, a workflow execution plan, the workflow execution plan including workload metadata defining a plurality of workloads associated with a plurality of edge service instances, the instances executing respectively on a plurality of edge computing devices within an edge computing system; translate the workload metadata to obtain workload configuration information for the plurality of workloads, the workload configuration information identifying a plurality of memory access configurations and service authorizations identifying at least one edge service instance of the edge service instances authorized to access one or more of the plurality of memory access configurations; partition the memory into a plurality of shared memory regions using the plurality of memory access configurations (where one or more of the shared memory regions may be used to protect data as well as metadata of the data, such as document owner or other metadata); and process a memory access request for accessing at least one of the plurality of shared memory regions based on the service authorizations, the memory access request received from an edge service instance of the plurality of edge service instances.

In Example 2, the subject matter of Example 1 includes subject matter where the instructions further configure the processing circuitry to perform operations to translate the workload metadata to obtain a plurality of functions scheduled for execution on one or more of the plurality of edge computing devices.

In Example 3, the subject matter of Example 2 includes, where the plurality of functions includes one or more of the following: named function networking (NFN) functions, and Function-as-a-Service (FaaS) functions.

In Example 4, the subject matter of Examples 2-3 includes, where the plurality of functions includes a homomorphic function, and the instructions further configure the processing circuitry to perform operations to register a function identification and a function bitstream of the homomorphic function with a shared protected memory region of the plurality of shared memory regions.

In Example 5, the subject matter of Example 4 includes, where the plurality of memory access configurations includes: a memory range associated with the shared protected memory region, the memory range storing encrypted data; device identification information of respective devices of the plurality of edge computing devices authorized to access the homomorphic function; and where the service authorizations identify a subset of the plurality of edge service instances authorized to access the memory range associated with the shared protected memory region.

In Example 6, the subject matter of Example 5 includes, where the encrypted data stored in the memory range associated with the shared protected memory region is protected via homomorphic encryption using the function bitstream of the homomorphic function.

In Example 7, the subject matter of Example 6 includes, where the memory access request identifies an edge service instance of the plurality of edge service instances requesting the memory access and an edge computing device of the plurality of edge computing devices executing the requesting edge service instance.

In Example 8, the subject matter of Example 7 includes, where the instructions further configure the processing circuitry to perform one or more data transformations on the encrypted data to process the memory access request when the device identification information identifies the edge computing device executing the requesting edge service instance.

In Example 9, the subject matter of Example 8 includes, where the instructions further configure the processing circuitry to offload performing of the one or more data transformations on the encrypted data to at least one of the edge computing devices of the plurality of edge computing devices authorized to access the homomorphic function.

In Example 10, the subject matter of Examples 1-9 includes, where the plurality of memory access configurations includes: a memory range associated with a shared memory region of the plurality of shared memory regions; and device identification information of edge computing devices of the plurality of edge computing devices authorized to share data stored in the shared memory region.

In Example 11, the subject matter of Example 10 includes, where the service authorizations include process address space IDs (PASIDs) identifying a subset of the plurality of edge service instances authorized to access the memory range associated with the shared memory region.

In Example 12, the subject matter of Example 11 includes, where the memory access request includes a PASID of an edge service instance of the plurality of edge service instances requesting the memory access and identifies an edge computing device of the plurality of edge computing devices executing the requesting edge service instance.

In Example 13, the subject matter of Example 12 includes, where the instructions further configure the processing circuitry to perform a memory read or a memory write operation on the data stored in the shared memory region to process the memory access request when the device identification information identifies the edge computing device executing the requesting edge service instance and the PSAIDs within the service authorizations include the PSAID within the memory access request.

In Example 14, the subject matter of Examples 1-13 includes, where the plurality of memory access configurations includes: a memory range associated with a protected memory region of the plurality of shared memory regions, where the protected memory region is configured as a trusted execution environment (TEE) of the edge computing device.

In Example 15, the subject matter of Examples 1-14 includes, where the plurality of memory access configurations includes a plurality of secure keys for accessing each of the plurality of shared memory regions.

In Example 16, the subject matter of Examples 1-15 includes, where the instructions further configure the processing circuitry to configure a virtual memory space mapped to at least one of the plurality of shared memory regions and to a second virtual memory space in an edge computing device of the plurality of edge computing devices, the edge computing device authorized to access the at least one of the plurality of shared memory regions.

In Example 17, the subject matter of Example 16 includes, where the virtual memory space is mapped to the second virtual memory space in the edge computing device using a distributed lock manager (DLM) service.

In Example 18, the subject matter of Example 17 includes, where the instructions further configure the processing circuitry to update data stored in the at least one of the plurality of shared memory regions based on the memory access request; and map the updated data stored in the at least one of the plurality of shared memory regions to the virtual memory space and to the second virtual memory space in the edge computing device via the DLM service.

In Example 19, the subject matter of Examples 1-18 includes, where the edge computing system is an Edge-as-a-Service (EaaS) system, and where the edge computing device is an EaaS microservice node.

Example 20 is at least one non-transitory machine-readable storage medium comprising instructions or stored data which may be configured into instructions, wherein the instructions, when configured and executed by a processing circuitry of an edge computing device operable in an edge computing system, cause the processing circuitry to perform operations that: obtain, from an orchestration provider, a workflow execution plan, the workflow execution plan including workload metadata defining a plurality of workloads associated with a plurality of edge service instances, the instances executing respectively on a plurality of edge computing devices within the edge computing system; translate the workload metadata to obtain workload configuration information for the plurality of workloads, the workload configuration information identifying a plurality of memory access configurations and service authorizations identifying at least one edge service instance of the edge service instances authorized to access one or more of the plurality of memory access configurations; partition the memory into a plurality of shared memory regions using the plurality of memory access configurations; and process a memory access request for accessing at least one of the plurality of shared memory regions based on the service authorizations, the memory access request received from an edge service instance of the plurality of edge service instances.

In Example 21, the subject matter of Example 20 includes, where the instructions further cause the processing circuitry to perform operations that: translate the workload metadata to obtain a plurality of functions scheduled for execution on one or more of the plurality of edge computing devices.

In Example 22, the subject matter of Example 21 includes, where the plurality of functions includes one or more of the following: named function networking (NFN) functions, and Function-as-a-Service (FaaS) functions.

In Example 23, the subject matter of Examples 21-22 includes, where the plurality of functions includes a homomorphic function, and where the instructions further cause the processing circuitry to perform operations that register a function identification and a function bitstream of the homomorphic function with a shared protected memory region of the plurality of shared memory regions.

In Example 24, the subject matter of Example 23 includes, where the plurality of memory access configurations includes: a memory range associated with the shared protected memory region, the memory range storing encrypted data; device identification information of respective devices of the plurality of edge computing devices authorized to access the homomorphic function; and where the service authorizations identify a subset of the plurality of edge service instances authorized to access the memory range associated with the shared protected memory region.

In Example 25, the subject matter of Example 24 includes, where the encrypted data stored in the memory range associated with the shared protected memory region is protected via homomorphic encryption using the function bitstream of the homomorphic function.

In Example 26, the subject matter of Example 25 includes, where the memory access request identifies an edge service instance of the plurality of edge service instances requesting the memory access and a second edge computing device of the plurality of edge computing devices executing the requesting edge service instance.

In Example 27, the subject matter of Example 26 includes, where the instructions further cause the processing circuitry to perform operations that: perform one or more data transformations on the encrypted data to process the memory access request when the device identification information identifies the second edge computing device executing the requesting edge service instance.

In Example 28, the subject matter of Example 27 includes, where the instructions further cause the processing circuitry to perform operations that: offload performing of the one or more data transformations on the encrypted data to at least one of the edge computing devices of the plurality of edge computing devices authorized to access the homomorphic function.

In Example 29, the subject matter of Examples 20-28 includes, where the plurality of memory access configurations includes: a memory range associated with a shared memory region of the plurality of shared memory regions; and device identification information of edge computing devices of the plurality of edge computing devices authorized to share data stored in the shared memory region.

In Example 30, the subject matter of Example 29 includes, where the service authorizations include process address space IDs (PASIDs) identifying a subset of the plurality of edge service instances authorized to access the memory range associated with the shared memory region.

In Example 31, the subject matter of Example 30 includes, where the memory access request includes a PASID of an edge service instance of the plurality of edge service instances requesting the memory access and identifies a second edge computing device of the plurality of edge computing devices executing the requesting edge service instance.

In Example 32, the subject matter of Example 31 includes, where the instructions further cause the processing circuitry to perform operations that: perform a memory read or a memory write operation on the data stored in the shared memory region to process the memory access request when the device identification information identifies the second edge computing device executing the requesting edge service instance and the PSAIDs within the service authorizations include the PSAID within the memory access request.

In Example 33, the subject matter of Examples 20-32 includes, where the plurality of memory access configurations includes: a memory range associated with a protected memory region of the plurality of shared memory regions, where the protected memory region is configured as a trusted execution environment (TEE) of the edge computing device.

In Example 34, the subject matter of Examples 20-33 includes, where the plurality of memory access configurations includes a plurality of secure keys for accessing each of the plurality of shared memory regions.

In Example 35, the subject matter of Examples 20-34 includes, where the instructions further cause the processing circuitry to perform operations that: configure a virtual memory space mapped to at least one of the plurality of shared memory regions and to a second virtual memory space in a second edge computing device of the plurality of edge computing devices, the second edge computing device authorized to access the at least one of the plurality of shared memory regions.

In Example 36, the subject matter of Example 35 includes, where the virtual memory space is mapped to the second virtual memory space in the second edge computing device using a distributed lock manager (DLM) service.

In Example 37, the subject matter of Example 36 includes, where the instructions further cause the processing circuitry to perform operations that update data stored in the at least one of the plurality of shared memory regions based on the memory access request and map the updated data stored in the at least one of the plurality of shared memory regions to the virtual memory space and to the second virtual memory space in the second edge computing device via the DLM service.

In Example 38, the subject matter of Examples 20-37 includes, where the edge computing system is an Edge-as-a-Service (EaaS) system, and where the edge computing device is an EaaS microservice node.

Example 39 is a method performed by an edge computing device operable in an edge computing system, comprising: obtaining, from an orchestration provider, a workflow execution plan, the workflow execution plan including workload metadata defining a plurality of workloads associated with a plurality of edge service instances, the instances executing respectively on a plurality of edge computing devices within the edge computing system; translating the workload metadata to obtain workload configuration information for the plurality of workloads, the workload configuration information identifying a plurality of memory access configurations and service authorizations identifying at least one edge service instance of the edge service instances authorized to access one or more of the plurality of memory access configurations; partitioning memory of the edge computing device into a plurality of shared memory regions using the plurality of memory access configurations; and processing a memory access request for accessing at least one of the plurality of shared memory regions based on the service authorizations, the memory access request received from an edge service instance of the plurality of edge service instances.

In Example 40, the subject matter of Example 39 includes, translating the workload metadata to obtain a plurality of functions scheduled for execution on one or more of the plurality of edge computing devices.

In Example 41, the subject matter of Example 40 includes, where the plurality of functions includes one or more of the following: named function networking (NFN) functions, and Function-as-a-Service (FaaS) functions.

In Example 42, the subject matter of Examples 40-41 includes, where the plurality of functions includes a homomorphic function, and the method further comprises: registering a function identification and a function bitstream of the homomorphic function with a shared protected memory region of the plurality of shared memory regions.

In Example 43, the subject matter of Example 42 includes, where the plurality of memory access configurations includes: a memory range associated with the shared protected memory region, the memory range storing encrypted data; device identification information of respective devices of the plurality of edge computing devices authorized to access the homomorphic function; and where the service authorizations identify a subset of the plurality of edge service instances authorized to access the memory range associated with the shared protected memory region.

In Example 44, the subject matter of Example 43 includes, where the encrypted data stored in the memory range associated with the shared protected memory region is protected via homomorphic encryption using the function bitstream of the homomorphic function.

In Example 45, the subject matter of Example 44 includes, where the memory access request identifies an edge service instance of the plurality of edge service instances requesting the memory access and a second edge computing device of the plurality of edge computing devices executing the requesting edge service instance.

In Example 46, the subject matter of Example 45 includes, performing one or more data transformations on the encrypted data to process the memory access request when the device identification information identifies the second edge computing device executing the requesting edge service instance.

In Example 47, the subject matter of Example 46 includes, offloading performing of the one or more data transformations on the encrypted data to at least one of the edge computing devices of the plurality of edge computing devices authorized to access the homomorphic function.

In Example 48, the subject matter of Examples 39-47 includes, where the plurality of memory access configurations includes: a memory range associated with a shared memory region of the plurality of shared memory regions; and device identification information of edge computing devices of the plurality of edge computing devices authorized to share data stored in the shared memory region.

In Example 49, the subject matter of Example 48 includes, where the service authorizations include process address space IDs (PASIDs) identifying a subset of the plurality of edge service instances authorized to access the memory range associated with the shared memory region.

In Example 50, the subject matter of Example 49 includes, where the memory access request includes a PASID of an edge service instance of the plurality of edge service instances requesting the memory access and identifies a second edge computing device of the plurality of edge computing devices executing the requesting edge service instance.

In Example 51, the subject matter of Example 50 includes, performing a memory read or a memory write operation on the data stored in the shared memory region to process the memory access request when the device identification information identifies the second edge computing device executing the requesting edge service instance and the PSAIDs within the service authorizations include the P SAID within the memory access request.

In Example 52, the subject matter of Examples 39-51 includes, where the plurality of memory access configurations includes: a memory range associated with a protected memory region of the plurality of shared memory regions, where the protected memory region is configured as a trusted execution environment (TEE) of the edge computing device.

In Example 53, the subject matter of Examples 39-52 includes, where the plurality of memory access configurations includes a plurality of secure keys for accessing each of the plurality of shared memory regions.

In Example 54, the subject matter of Examples 39-53 includes, configuring a virtual memory space mapped to at least one of the plurality of shared memory regions and to a second virtual memory space in a second edge computing device of the plurality of edge computing devices, the second edge computing device authorized to access the at least one of the plurality of shared memory regions.

In Example 55, the subject matter of Example 54 includes, where the virtual memory space is mapped to the second virtual memory space in the second edge computing device using a distributed lock manager (DLM) service.

In Example 56, the subject matter of Example 55 includes, updating data stored in the at least one of the plurality of shared memory regions based on the memory access request; and mapping the updated data stored in the at least one of the plurality of shared memory regions to the virtual memory space and to the second virtual memory space in the second edge computing device via the DLM service.

In Example 57, the subject matter of Examples 39-56 includes, where the edge computing system is an Edge-as-a-Service (EaaS) system, and where the edge computing device is an EaaS microservice node.

Example 58 is at least one machine-readable medium including instructions that, when executed by processing circuitry, cause the processing circuitry to perform operations to implement of any of Examples 1-57.

Example 59 is an apparatus comprising means to implement of any of Examples 1-57.

Example 60 is a system to implement of any of Examples 1-57.

Example 61 is a method to implement of any of Examples 1-57.

Example 62 may include one or more computer-readable storage media comprising data to cause an electronic device, upon loading, execution, configuration, or provisioning of the data by one or more processors or electronic circuitry of the electronic device, to perform one or more elements of a method described in or related to any of Examples 1-57, or any other method or process described herein.

In the above Detailed Description, various features may be grouped together to streamline the disclosure. However, claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A system comprising:
    memory; and
    processing circuitry coupled to the memory, the processing circuitry to:
        partition the memory into a plurality of shared memory regions associated with a plurality of memory address ranges using a plurality of memory access configurations, the plurality of shared memory regions of the memory configured for shared access among a plurality of edge computing devices based at least on a mapping between the plurality of memory address ranges and identification information of the plurality of edge computing devices;
        configure a shared memory region of the plurality of shared memory regions of the memory for shared access by the plurality of edge computing devices based on data in a memory access configuration of the plurality of memory access configurations, the data including the mapping and identifying a memory address range of the plurality of memory address ranges for an edge computing device of the plurality of edge computing devices, the memory address range configured in the shared memory region;
        configure the shared memory region of the plurality of shared memory regions for a raw mode access by at least two edge computing devices of the plurality of edge computing devices, wherein during the raw mode access, the shared memory region includes an encrypted memory portion storing encrypted data, the encrypted memory portion specified by an encrypted address range, and the encrypted memory portion enabled for read and write access by the at least two edge computing devices;
        process a memory access request for accessing the shared memory region in accordance with the memory access configuration, the memory access request received via a communication network from an edge computing device of the plurality of edge computing devices; and
        complete processing of the memory access request based on granting the edge computing device access to the memory address range configured in the shared memory region.

2. The system of claim 1, wherein the processing circuitry is to:
    configure the shared memory region of the plurality of shared memory regions for a protected mode access by an edge computing device of the plurality of edge computing devices, wherein during the protected mode access, the shared memory region stores data of the edge computing device, and the data being isolated in a trusted execution environment within the shared memory region.

3. The system of claim 1, wherein the processing circuitry is to:
    configure the shared memory region of the plurality of shared memory regions for a shared plain mode access by at least two edge computing devices of the plurality of edge computing devices, wherein during the shared plain mode access, the shared memory region stores data enabled for secure shared access among the at least two edge computing devices or by applications executing on the at least two edge computing devices.

4. The system of claim 3, wherein the processing circuitry is to:
    configure the shared memory region of the plurality of shared memory regions for a shared homomorphic protected mode access by at least two edge computing devices of the plurality of edge computing devices, wherein during the shared homomorphic protected mode access, the shared memory region stores data enabled for the secure shared access among the at least two edge computing devices or by applications executing on the at least two edge computing devices and the data is encrypted using homomorphic encryption.

5. The system of claim 1, wherein the processing circuitry is to:
    obtain a plurality of device identifications of devices authorized to access the plurality of shared memory regions using the plurality of memory access configurations, the plurality of device identifications corresponding to the plurality of edge computing devices.

6. The system of claim 5, wherein the plurality of memory access configurations further identify particular one or more edge computing devices of the plurality of edge computing devices authorized to access each memory region of the plurality of memory regions.

7. The system of claim 1, wherein the processing circuitry is to:
    detect data is stored in the shared memory region of the plurality of shared memory regions, the data being shared between one or more edge computing devices of the plurality of edge computing devices.

8. The system of claim 7, wherein the processing circuitry is to:
    replicate the data into a virtual memory region, the virtual memory region associated with at least one additional virtual memory region of the one or more edge computing devices, wherein replicating the data into the virtual memory region causes replication of the data from the virtual memory region to the at least one additional virtual memory region of the one or more edge computing devices.

9. A method comprising:
    partitioning a memory into a plurality of shared memory regions associated with a plurality of memory address ranges using a plurality of memory access configurations, the plurality of shared memory regions of the memory configured for shared access among a plurality of edge computing devices based at least on a mapping between the plurality of memory address ranges and identification information of the plurality of edge computing devices;
    configuring a shared memory region of the plurality of shared memory regions of the memory for shared access by the plurality of edge computing devices based on data in a memory access configuration of the plurality of memory access configurations, the data including the mapping and identifying a memory address range of the plurality of memory address ranges for an edge computing device of the plurality of edge computing devices, the memory address range configured in the shared memory region;
    configuring the shared memory region of the plurality of shared memory regions for a raw mode access by at least two edge computing devices of the plurality of edge computing devices, wherein during the raw mode access, the shared memory region includes an encrypted memory portion storing encrypted data, the encrypted memory portion specified by an encrypted address range, and the encrypted memory portion enabled for read and write access by the at least two edge computing devices;
    processing a memory access request for accessing the shared memory region in accordance with the memory access configuration, the memory access request received via a communication network from an edge computing device of the plurality of edge computing devices; and
    completing the processing of the memory access request based on granting the edge computing device access to the memory address range configured in the shared memory region.

10. The method of claim 9, further comprising:
    configuring the shared memory region of the plurality of shared memory regions for a protected mode access by an edge computing device of the plurality of edge computing devices, wherein during the protected mode access, the shared memory region stores data of the edge computing device, and the data being isolated in a trusted execution environment within the shared memory region.

11. The method of claim 9, further comprising:
    configuring the shared memory region of the plurality of shared memory regions for a shared plain mode access by at least two edge computing devices of the plurality of edge computing devices, wherein during the shared plain mode access, the shared memory region stores data enabled for secure shared access among the at least two edge computing devices or by applications executing on the at least two edge computing devices.

12. The method of claim 11, further comprising:
    configuring the shared memory region of the plurality of shared memory regions for a shared homomorphic protected mode access by at least two edge computing devices of the plurality of edge computing devices, wherein during the shared homomorphic protected mode access, the shared memory region stores data enabled for the secure shared access among the at least two edge computing devices or by applications executing on the at least two edge computing devices and the data is encrypted using homomorphic encryption.

13. The method of claim 9, further comprising:
    decoding the plurality of memory access configurations to obtain a plurality of device identifications of devices authorized to access the plurality of shared memory regions, the plurality of device identifications corresponding to the plurality of edge computing devices,
    wherein the plurality of memory access configurations further identify particular one or more edge computing devices of the plurality of edge computing devices authorized to access each shared memory region of the plurality of shared memory regions.

14. The method of claim 9, further comprising:
    detecting data is stored in the shared memory region of the plurality of shared memory regions, the data being shared between one or more edge computing devices of the plurality of edge computing devices; and
    replicating the data into a virtual memory region, the virtual memory region associated with at least one additional virtual memory region of the one or more edge computing devices, wherein replicating the data into the virtual memory region causes replication of the data from the virtual memory region to the at least one additional virtual memory region of the one or more edge computing devices.

15. A non-transitory computer-readable storage medium that stores instructions for execution by one or more processors of a computing device to cause the computing device to perform operations comprising:
    partitioning a memory into a plurality of shared memory regions associated with a plurality of memory address ranges using a plurality of memory access configurations, the plurality of shared memory regions of the memory configured for shared access among a plurality of edge computing devices based at least on a mapping between the plurality of memory address ranges and identification information of the plurality of edge computing devices;
    configuring a shared memory region of the plurality of shared memory regions of the memory for shared access by the plurality of edge computing devices based on data in a memory access configuration of the plurality of memory access configurations, the data including the mapping and identifying a memory address range of the plurality of memory address ranges for an edge computing device of the plurality of edge computing devices, the memory address range configured in the shared memory region;

configuring the shared memory region of the plurality of shared memory regions for a raw mode access by at least two edge computing devices of the plurality of edge computing devices, wherein during the raw mode access, the shared memory region includes an encrypted memory portion storing encrypted data, the encrypted memory portion specified by an encrypted address range, and the encrypted memory portion enabled for read and write access by the at least two edge computing devices;

processing a memory access request for accessing the shared memory region in accordance with the memory access configuration, the memory access request received via a communication network from an edge computing device of the plurality of edge computing devices; and completing the processing of the memory access request based on granting the edge computing device access to the memory address range configured in the shared memory region.

16. The non-transitory computer-readable storage medium of claim 15, the operations further comprising:

configuring the shared memory region of the plurality of shared memory regions for one of:

a protected mode access by an edge computing device of the plurality of edge computing devices, wherein during the protected mode access, the shared memory region stores data of the edge computing device, and the data being isolated in a trusted execution environment within the shared memory region;

a shared plain mode access by at least two edge computing devices of the plurality of edge computing devices, wherein during the shared plain mode access, the shared memory region stores data enabled for secure shared access among the at least two edge computing devices or by applications executing on the at least two edge computing devices; and a shared homomorphic protected mode access by at least two edge computing devices of the plurality of edge computing devices, wherein during the shared homomorphic protected mode access, the shared memory region stores data enabled for the secure shared access among the at least two edge computing devices or by applications executing on the at least two edge computing devices and the data is encrypted using homomorphic encryption.

17. The non-transitory computer-readable storage medium of claim 15, the operations further comprising:

decoding the plurality of memory access configurations to obtain a plurality of device identifications of devices authorized to access the plurality of shared memory regions, the plurality of device identifications corresponding to the plurality of edge computing devices, wherein the plurality of memory access configurations further identify particular one or more edge computing devices of the plurality of edge computing devices authorized to access each shared memory region of the plurality of shared memory regions.

18. The non-transitory computer-readable storage medium of claim 15, the operations further comprising:

detecting data is stored in the shared memory region of the plurality of shared memory regions, the data being shared between one or more edge computing devices of the plurality of edge computing devices; and replicating the data into a virtual memory region, the virtual memory region associated with at least one additional virtual memory region of the one or more edge computing devices, wherein replicating the data into the virtual memory region causes replication of the data from the virtual memory region to the at least one additional virtual memory region of the one or more edge computing devices.

\* \* \* \* \*